US009756128B2

United States Patent
Lomelino et al.

(10) Patent No.: US 9,756,128 B2
(45) Date of Patent: *Sep. 5, 2017

(54) SWITCHED DIRECT ATTACHED SHARED STORAGE ARCHITECTURE

(71) Applicant: APEIRON DATA SYSTEMS, El Dorado Hills, CA (US)

(72) Inventors: Larry Lomelino, Folsom, CA (US); Christopher Christ, Folsom, CA (US); Gunneswara Rao Marripudi, Fremont, CA (US); Harry Laswell, Sacramento, CA (US)

(73) Assignee: APEIRON DATA SYSTEMS, Folsom, CA (US)

( * ) Notice: Subject to any disclaimer, the term of this patent is extended or adjusted under 35 U.S.C. 154(b) by 123 days.

This patent is subject to a terminal disclaimer.

(21) Appl. No.: 14/254,868

(22) Filed: Apr. 16, 2014

(65) Prior Publication Data

US 2014/0317206 A1    Oct. 23, 2014

Related U.S. Application Data

(60) Provisional application No. 61/812,916, filed on Apr. 17, 2013, provisional application No. 61/812,927, filed on Apr. 17, 2013.

(51) Int. Cl.
| | |
|---|---|
| *G06F 15/16* | (2006.01) |
| *H04L 29/08* | (2006.01) |
| *H04L 12/58* | (2006.01) |
| *H04L 12/46* | (2006.01) |

(52) U.S. Cl.
CPC ...... *H04L 67/1097* (2013.01); *H04L 12/4633* (2013.01); *H04L 51/04* (2013.01)

(58) Field of Classification Search
USPC ............... 709/206, 219, 223, 220, 222, 238
See application file for complete search history.

(56) References Cited

U.S. PATENT DOCUMENTS

| 7,681,130 B1 * | 3/2010 | Lavallee | H04L 41/22 715/735 |
|---|---|---|---|
| 8,190,947 B1 * | 5/2012 | Holl | G06F 11/1435 709/203 |
| 8,200,880 B2 | 6/2012 | Higuchi | |

(Continued)

*Primary Examiner* — Lan-Dai T Truong
(74) *Attorney, Agent, or Firm* — Inventive Patent Law P.C.; Jim H. Salter

(57) ABSTRACT

Various embodiments for implementing a switched direct attached shared storage architecture as disclosed herein include: providing a plurality of compute nodes, each compute node having integrated compute capabilities, data storage, and a network interface controller (Host NIC), the plurality of compute nodes being in data communication with each other via a local area network, the plurality of compute nodes each including distributed storage processing software resident thereon; providing a plurality of physical data storage devices in data communication with a storage controller; and enabling data communications in a data store switch fabric between the plurality of compute nodes and the plurality of physical data storage devices via the Host NIC and the storage controller, the data store switch fabric encapsulating data requests from the plurality of compute nodes into data frames for transport to corresponding physical data storage devices.

18 Claims, 25 Drawing Sheets

(56) References Cited

U.S. PATENT DOCUMENTS

| | | |
|---|---|---|
| 8,417,865 B2 | 4/2013 | Higuchi |
| 8,489,795 B2 | 7/2013 | Suganuma |
| 8,677,031 B2 | 3/2014 | Tamir |
| 9,483,431 B2 | 11/2016 | Bergsten |
| 2002/0031142 A1 | 3/2002 | Metin |
| 2004/0243737 A1 | 12/2004 | Beardsley |
| 2009/0080428 A1 | 3/2009 | Witkowski |
| 2009/0248947 A1 | 10/2009 | Malwankar |
| 2010/0083285 A1* | 4/2010 | Bahat ................ G06F 17/30997 719/328 |
| 2010/0115174 A1 | 5/2010 | Akyol |
| 2010/0250823 A1 | 9/2010 | Suganuma |
| 2012/0218905 A1 | 8/2012 | Pettey |
| 2012/0221705 A1 | 8/2012 | Pettey |
| 2012/0250689 A1 | 10/2012 | Pettey |
| 2013/0111077 A1 | 5/2013 | Gowravaram |
| 2013/0198311 A1 | 8/2013 | Tamir |
| 2013/0198312 A1 | 8/2013 | Tamir |
| 2014/0136646 A1 | 5/2014 | Tamir |
| 2014/0189443 A1* | 7/2014 | Xu ........................ H04L 47/10 714/48 |
| 2014/0281169 A1* | 9/2014 | Mehrotra ............ G06F 12/0866 711/103 |
| 2014/0281196 A1* | 9/2014 | Dixon ..................... G06F 12/14 711/105 |
| 2014/0317206 A1 | 10/2014 | Lomelino |
| 2015/0222705 A1* | 8/2015 | Stephens ............... G06F 3/0611 709/214 |
| 2015/0248366 A1 | 9/2015 | Bergsten |

\* cited by examiner

| Field Name | Tag Type | Object Source | Object Locator | Object Features |
|---|---|---|---|---|

Figure 23

```
┌─────────────────────────────────────────────────┐
│   Switched Direct Attached Shared Data Storage System   │
│              Processing Logic                    │
│                   -401-                          │
└─────────────────────────────────────────────────┘
                      ▼
┌─────────────────────────────────────────────────┐
│  Provide a plurality of compute nodes, each compute node having integrated │
│ compute capabilities, data storage, and a network interface controller (Host NIC), │
│  the plurality of compute nodes being in data communication with each other via │
│    a local area network, the plurality of compute nodes each including distributed │
│          storage processing software resident thereon. │
│                   -410-                          │
└─────────────────────────────────────────────────┘
                      ▼
┌─────────────────────────────────────────────────┐
│ Provide a plurality of physical data storage devices in data communication with a │
│                  storage controller.             │
│                   -420-                          │
└─────────────────────────────────────────────────┘
                      ▼
┌─────────────────────────────────────────────────┐
│ Enable data communications in a data store switch fabric between the plurality of │
│    compute nodes and the plurality of physical data storage devices via the Host │
│   NIC and the storage controller, the data store switch fabric encapsulating data │
│    requests from the plurality of compute nodes into data frames for transport to │
│              corresponding physical data storage devices. │
│                   -430-                          │
└─────────────────────────────────────────────────┘
                      ▼
              Figure 24   ( End )
```

SWITCHED DIRECT ATTACHED SHARED STORAGE ARCHITECTURE

PRIORITY PATENT APPLICATIONS

This is a non-provisional patent application drawing priority from U.S. provisional patent application Ser. No. 61/812,916; filed Apr. 17, 2013. This is a non-provisional patent application drawing priority from U.S. provisional patent application Ser. No. 61/812,927; filed Apr. 17, 2013.

This present non-provisional patent application draws priority from the referenced provisional patent applications. The entire disclosure of the referenced patent applications is considered part of the disclosure of the present application and is hereby incorporated by reference herein in its entirety.

COPYRIGHT

A portion of the disclosure of this patent document contains material that is subject to copyright protection. The copyright owner has no objection to the facsimile reproduction of the patent document or the patent disclosure, as it appears in the Patent and Trademark Office patent files or records, but otherwise reserves all copyright rights whatsoever. The following notice applies to the software and data as described below and in the drawings that form a part of this document: Copyright 2013-2014 Apeiron Data Systems, Inc., All Rights Reserved.

TECHNICAL FIELD

The disclosed subject matter relates to the field of data access storage methods and systems.

BACKGROUND

The amount of data in our world has been exploding. All this data need to be stored and analyzed to extract value. The fundamental requirements for data storage and analysis to meet the rapid growth in data rates include:
1. Capacity—Seamlessly store and analyze peta-bytes of data;
2. Scalability—Add more compute and storage capacities as data storage requirements grow;
3. Accessibility—Maintain continuous access to stored data in the presence of hardware failures;
4. Performance—Increase performance as more resources are added incrementally; and
5. Cost—Maintain low total cost of ownership.

However, conventional data storage architectures do not provide an efficient solution that addresses all of these requirements without any trade-offs.

BRIEF DESCRIPTION OF THE DRAWINGS

The various embodiments are illustrated by way of example, and not by way of limitation, in the figures of the accompanying drawings in which:

FIG. 23 illustrates the object tag format for the object store of the example embodiment;

FIG. 24 is a flow diagram illustrating the basic processing flow for a particular embodiment of a switched direct attached shared storage architecture.

DETAILED DESCRIPTION

In the following detailed description, a reference is made to the accompanying drawings that form a part hereof, and in which are shown, by way of illustration, specific embodiments in which the disclosed subject matter can be practiced. It is understood that other embodiments may be utilized and structural changes may be made without departing from the scope of the disclosed subject matter.

According to various example embodiments of the disclosed subject matter as described herein, there is provided a system and method for implementing a switched direct attached shared storage architecture. The various embodiments described herein provide a new data storage architecture to meet the above requirements to help enterprises extract value from the vast amounts of data they have been capturing. In today's market place, there are three markedly distinct solutions that try to address the above-listed requirements of growing needs of data storage and analysis. These three conventional solutions are listed below:

1. Cluster of nodes with integrated storage—In the storage industry parlance, this topology is often referred to as "Clustered Direct Attached Storage" (Clustered DAS or DAS) configuration;
2. Virtual Storage Area Network (VSAN); and
3. Shared storage connected over a network—In the storage industry parlance, this topology is often referred to as "Network Attached Storage" (NAS) or "Storage Area Networks" (SAN).

These three conventional solutions are each described in more detail in the following sections and illustrated in FIGS. 1 through 5.

Clustered DAS

Figure 1:
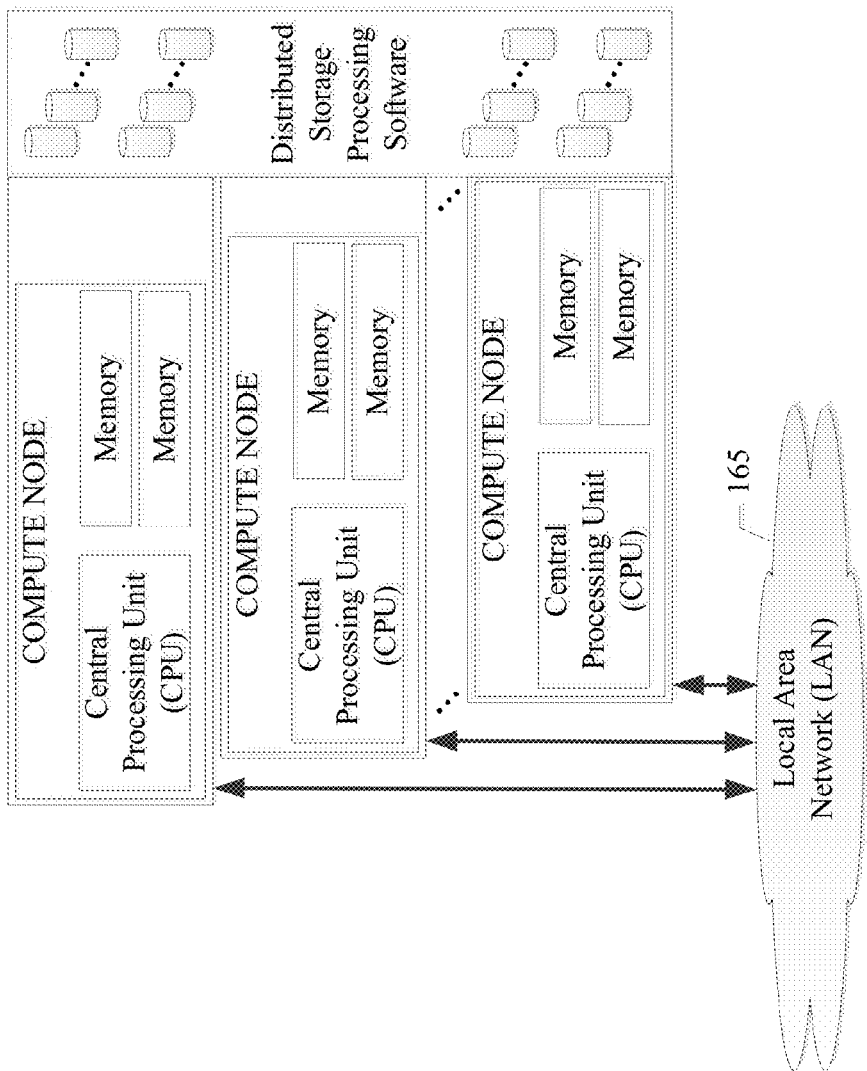
FIGS. 1 through 3 illustrate a Clustered Direct Attach Storage (Clustered DAS) configuration of conventional systems.
Figure 2:
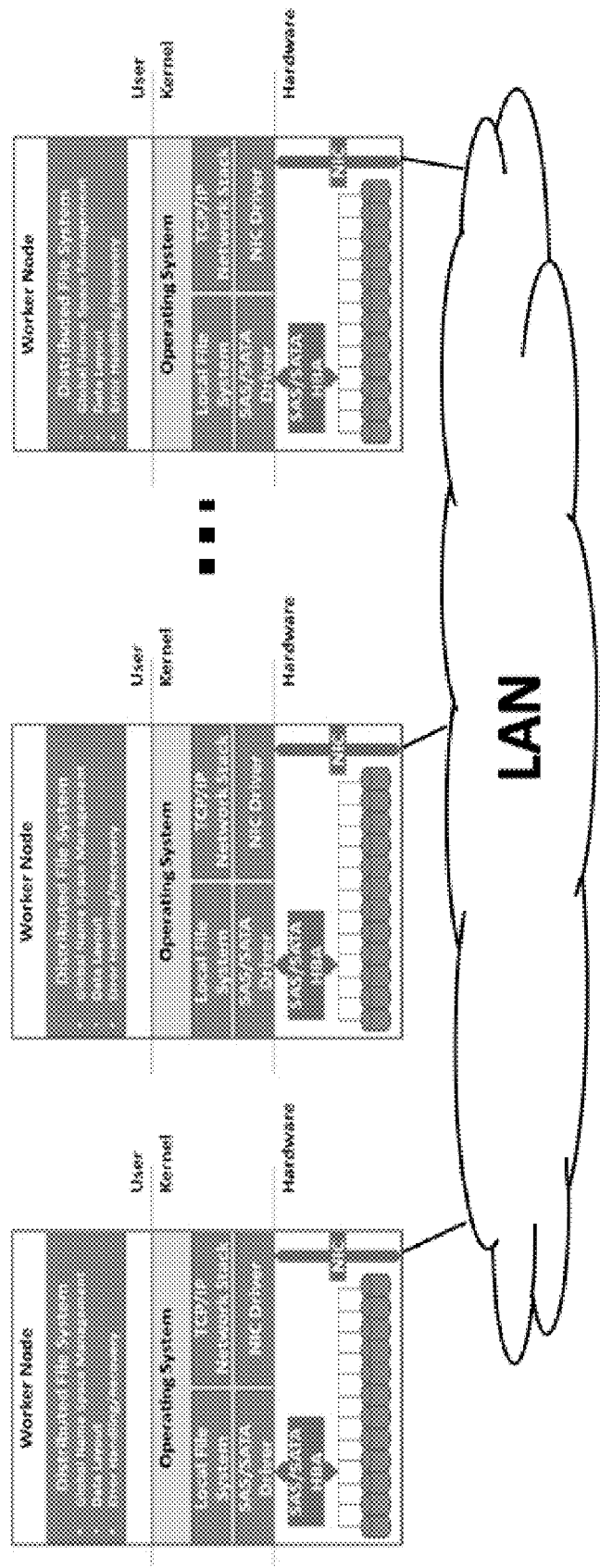
Figure 3:
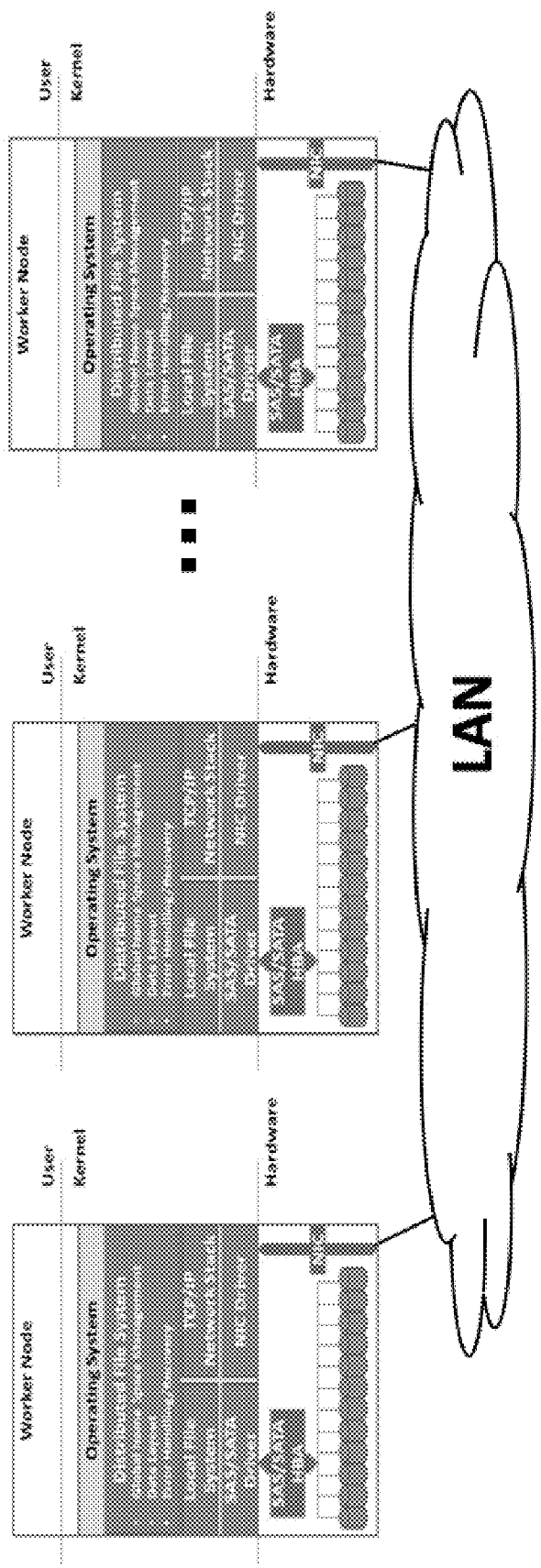

FIG. 1 illustrates an example of the conventional Clustered DAS topology. Clustered DAS is typically dedicated to a single server and is not sharable among multiple servers. FIG. 2 illustrates a software representation of the Clustered DAS with a user-space distributed file system. FIG. 3 illustrates a software representation of this Clustered DAS with a kernel-space distributed file system.

VSAN

A virtual storage area network (VSAN) is a collection of ports, from a set of connected switches, that form a virtual storage fabric. In general, a VSAN enables management software to serve data storage on cluster nodes to other cluster nodes.

NAS

Figure 4:
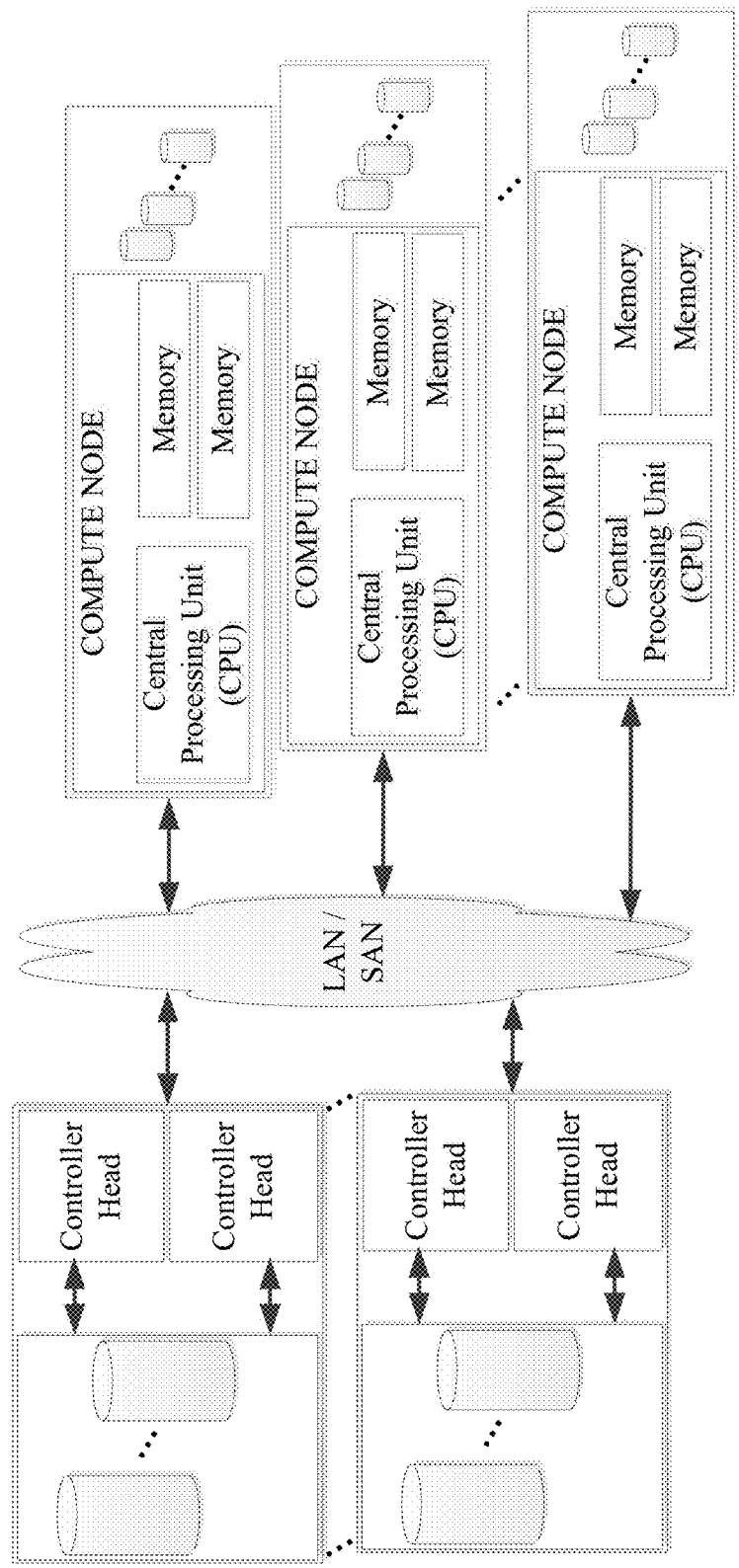
FIGS. 4 and 5 illustrate a Network Attached Storage (NAS) or Storage Area Network (SAN) configuration of conventional systems.
Figure 5:
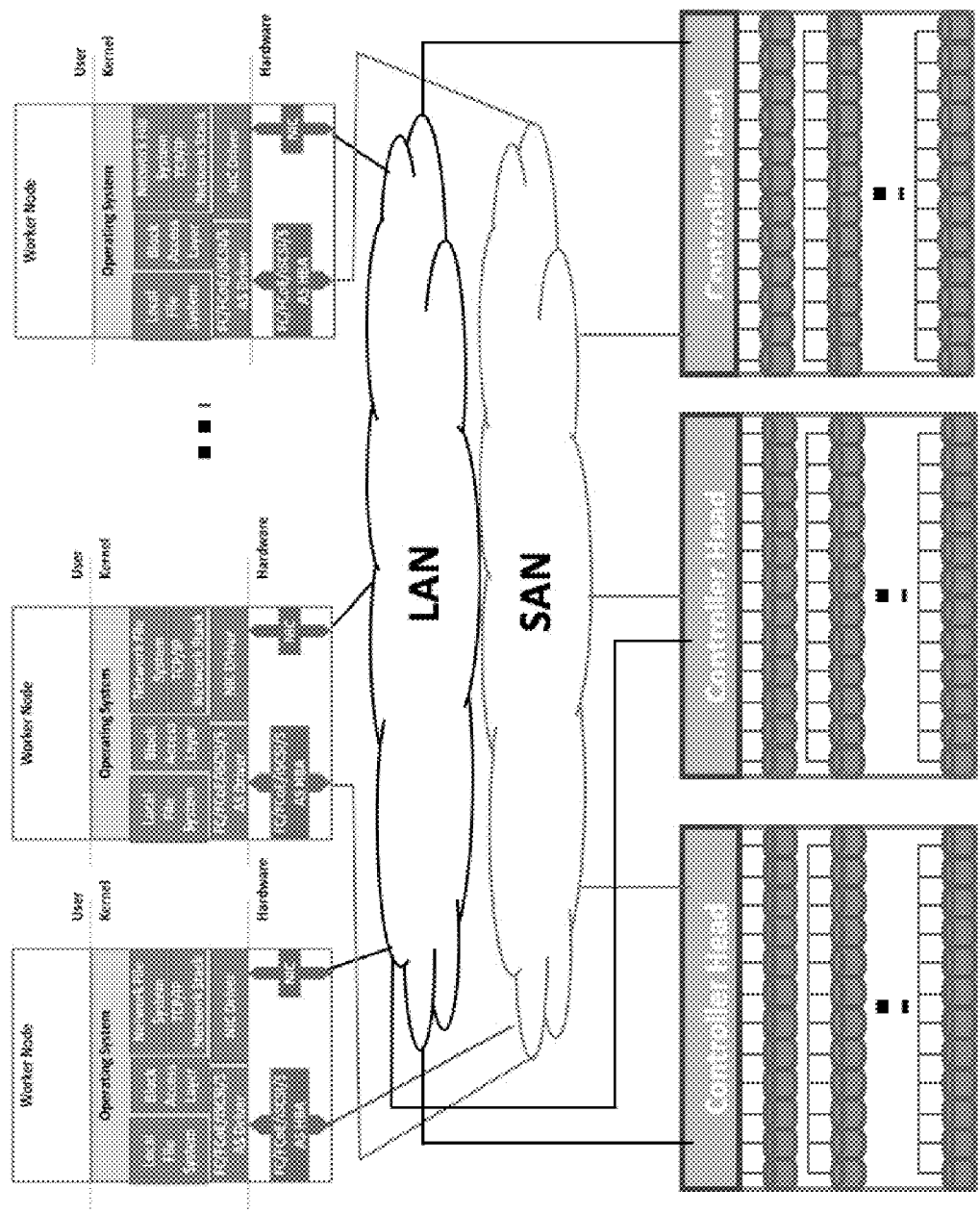

FIG. 4 illustrates an example of the conventional NAS/SAN topology. NAS/SAN can be shared among several server applications. FIG. 5 illustrates a software representation of the NAS/SAN.

Each of the conventional data storage configurations described above are sub-optimal in addressing the growing data storage and analysis needs. The following table summarizes the challenges with DAS and NAS/SAN architectures in comprehensively meeting the solution requirements.

| Solution Attribute | DAS | NAS/SAN |
|---|---|---|
| Capacity | Peta-bytes of capacity can be built using building blocks that have well-defined compute processing and storage capacity. This is usually achieved with a 2U server with 1 or 2 CPU sockets and 12 drives for storage, with all drives populated. | Compute capacity can be built using building blocks that have well-defined compute processing. This is usually achieved with a 2U server with 1 or 2 CPU sockets and 12 drives for storage, with drives sparsely populated. |
| Scalability | The challenge is that the compute and storage capacities can't grow independently of one another. This limits the expansion capabilities to meet differing compute and storage requirements of multiple workloads sharing the cluster, and would result in utilization inefficiencies. | While this topology allows compute and storage capacities to grow independently of one another, the challenge is that the storage capacity will need to grow as a step function in increments of controller head capability to process data. This would result in overprovisioning and utilization inefficiencies. |
| Accessibility | When expensive NAND flash based storage media is used within a compute node, it's rendered useless when the compute node is down or disconnected from the cluster due to some unrelated hardware failures. | Storage media is usually tied to one or two controller heads, and in the event of cascading failures, the data could go out of access until after a coarse granular recovery takes place. |
| Performance | Given that storage media is tied within a compute node box, all remote access to it must go over a cluster network typically shared with other critical data traffic among distributed workloads. This impacts performance on both data and storage traffic. If physical resources are virtualized in an attempt to address some of the accessibility issues discussed above, it will result in additional storage processing overhead and increased network traffic. | Multiple protocol translations are required as the data traverses from compute node to the controller head to the physical storage media. This introduces unnecessary performance overhead in network throughput and compute capacity. This is significantly exacerbated in situations where the compute cluster is running a distributed processing framework that has built-in distributed storage semantics. In such deployments, some of the work done in the controller head is unwarranted. |
| Cost | While acquisition costs for this architecture could be cheap, they do run into other operational costs, such as inability to power down/hibernate some unused compute nodes because it will take away the attached storage from the cluster. | NAS/SAN solutions come with the controller head where intelligent software is run to manage the physical storage media. This usually increases the cost of the solution a lot more than the cost of storage physical media. In deployments, where there is enough compute capacity present to perform the data analysis, costs to cover the controller head become a necessary overhead that can be eliminated. |

While DAS and NAS/SAN architectures can be used to build a data storage solution, these architectures fail to efficiently address the exponential growth in data storage and analysis needs. As the table below illustrates, these conventional architectures do not provide an efficient or optimal solution that addresses all the requirements without any trade-offs.

| Solution Attribute | DAS | NAS/SAN |
|---|---|---|
| Capacity | Yes | Yes |
| Scalability | No | Maybe |
| Accessibility | No | No |
| Performance | No | No |
| Cost | Yes | No |

Switched Direct Attached Shared Data Storage Architecture

Figure 6:
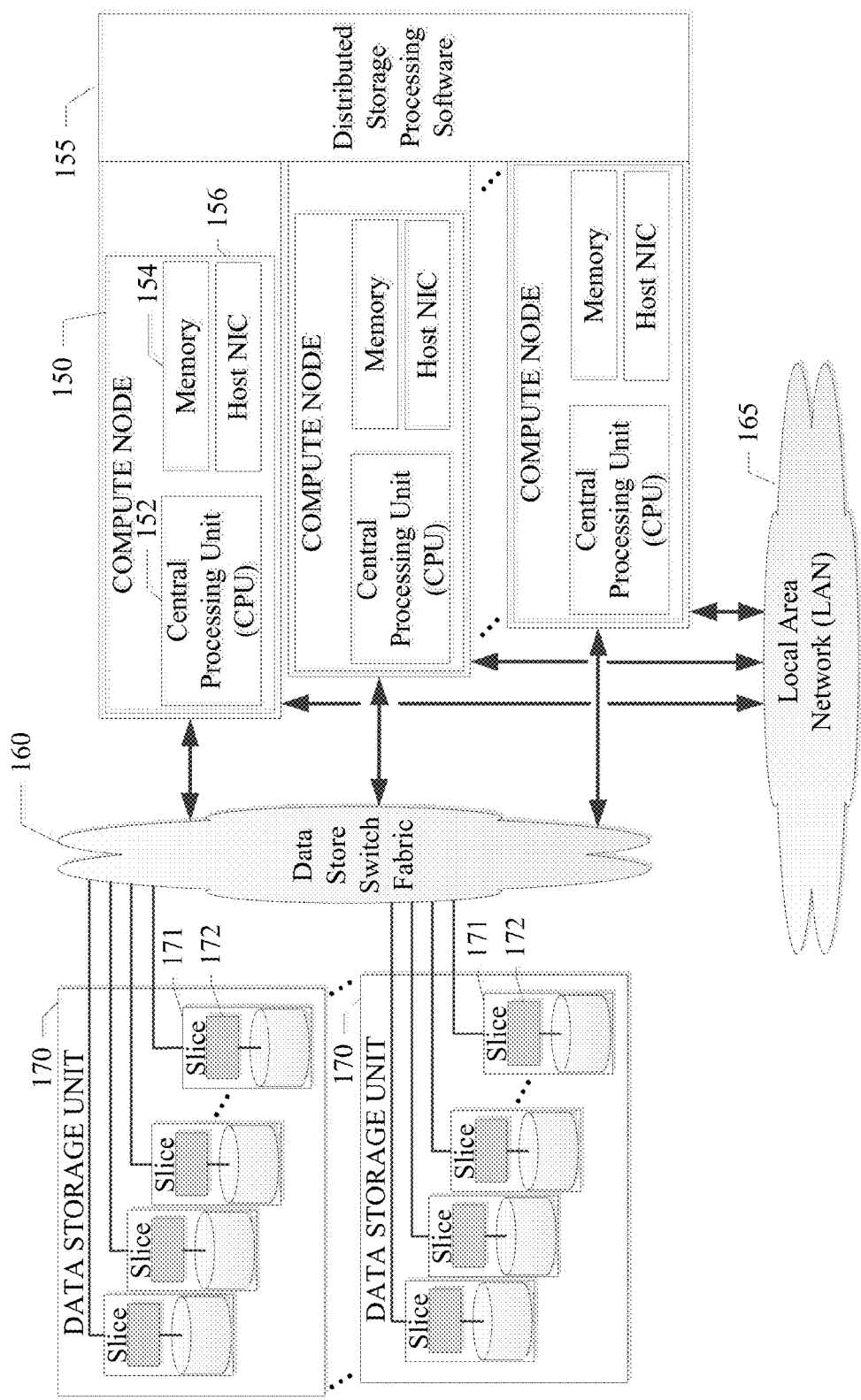
FIG. 6 illustrates an example embodiment of a switched direct attached shared storage architecture.

Referring now to FIG. 6, the switched direct attached shared data storage architecture and system 100 of an example embodiment is shown. The various embodiments described herein detail a new data storage architecture, Switched Direct Attached Storage or Switched DAS, to implement scale out clusters that need both storage and compute capacities. As described herein, a cluster represents a cluster of nodes, wherein each node has integrated compute capabilities and data storage. To meet all the solution requirements of growing data and analysis, the architecture of the various embodiments described herein leverages among the following features:

Packet switching and routing features in storage media interface fabrics;
Centralized physical storage media with native interface connectivity to the fabric;
Native storage media interface protocols to avoid multiple protocol conversions; and Distributed storage processing software layer on compute nodes.

The Switched DAS architecture of an example embodiment has the flexibility to adapt to numerous underlying storage media interface protocols, and can also be extended to other clustering interconnect technologies via protocol encapsulation. The various embodiments described herein can be implemented with the most popular and standards based native storage media protocols, such as: NVMe (NVM Express), SAS/SATA, or SCSI over PCIe (SOP). NVM is an acronym for non-volatile memory, as used in SSDs. NVM Express is a specification for accessing solid-state drives (SSDs) attached through the PCI Express (PCIe) bus. Peripheral Component Interconnect Express (PCIe) is a high-speed serial computer expansion bus standard designed to replace older bus standards. Historically, most SSDs used buses, such as SATA (Serial ATA), SAS (Serial Attached Small Computer System Interface—SCSI), or Fibre Channel for interfacing with the rest of a computer system. SATA has been the most typical way for connecting SSDs in personal computers; however, SATA was designed for mechanical hard disk drives, and has become inadequate with SSDs. For example, unlike hard disk drives, some SSDs are limited by the maximum throughput of SATA. Serial Attached SCSI (SAS) is a point-to-point serial protocol that moves data to and from computer storage devices such as hard drives and tape drives. In an example embodiment, a data store switch fabric is implemented using Ethernet protocol and Ethernet data encapsulation. The following sections detail the specific procedures used in an example embodiment for: physical storage media assignment to compute nodes; data flow to/from the compute nodes and storage slices; and sharing of storage media in a Switched DAS cluster via a data store switch fabric.

Storage Assignment

Figure 7:
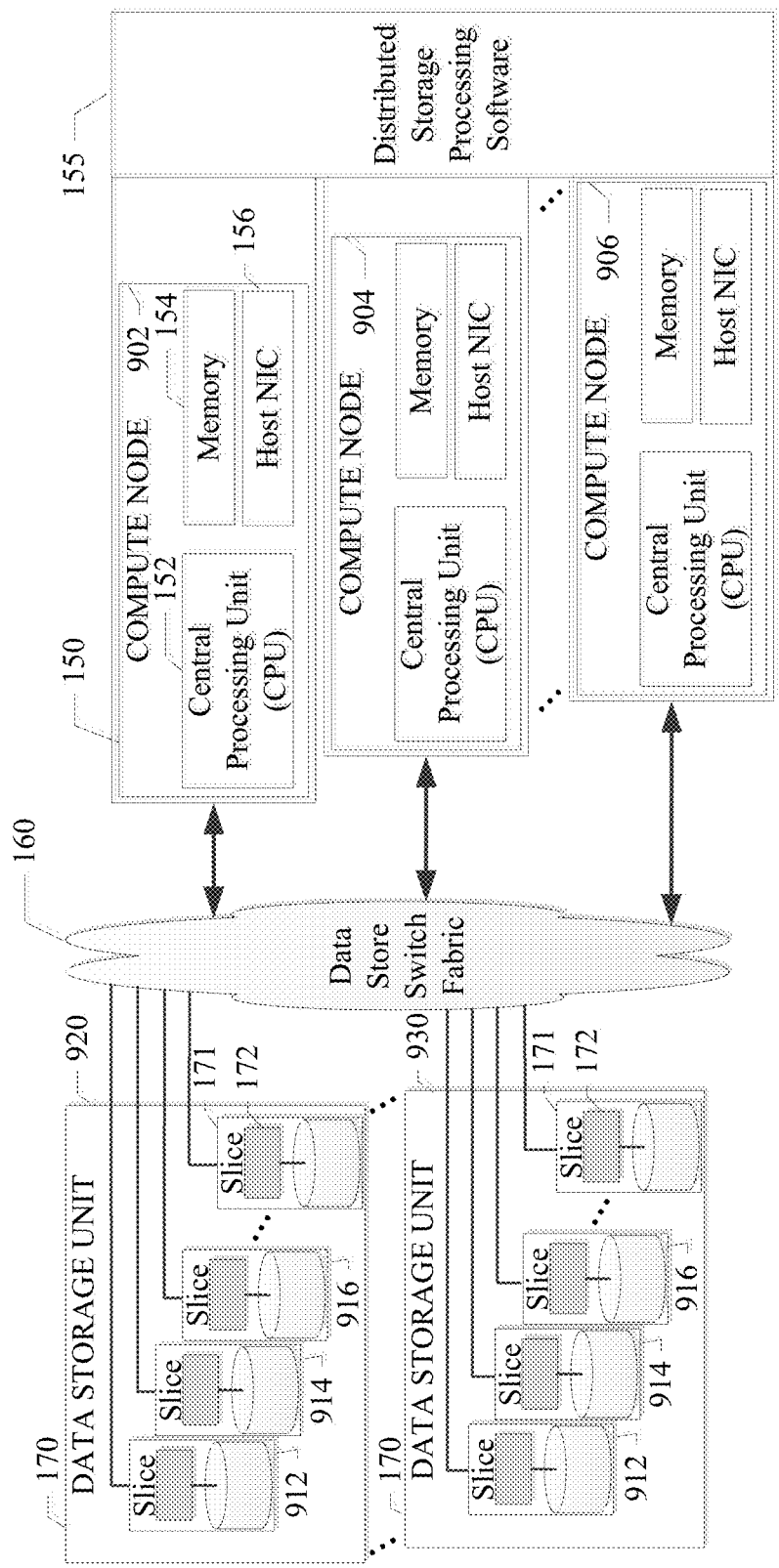
FIG. 7 illustrates the physical storage media assignment to compute nodes in an example embodiment.

Referring now to FIGS. 6 and 7, the physical storage media assignment to compute nodes in an example embodiment is illustrated. FIGS. 6 and 7 illustrate the physical configuration of the system hardware in an example embodiment. As shown in FIGS. 6 and 7, the plurality of compute nodes 150 can be interconnected with one or more data storage slices 171 of the physical storage media pool or storage media container 170 via a data store switch fabric 160. In an example embodiment, the compute nodes or servers 150 can also be in data communication with each other via a local area network 165 as shown in FIG. 6.

Figure 8:
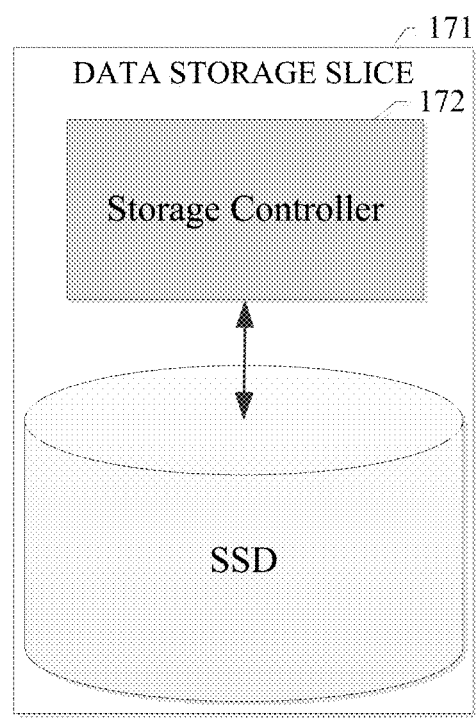
FIG. 8 illustrates how each storage slice is the physical unit of abstraction that can be plugged into a storage media container in an example embodiment.

As shown in FIG. 8, each data storage slice 171 is the physical unit of abstraction that can be plugged into or otherwise connected with a storage media container 170. To the data store switch fabric 160, each storage slice 171 can be associated with the storage controller 172 residing on or in data communication with the storage slice 171.

Figure 9:
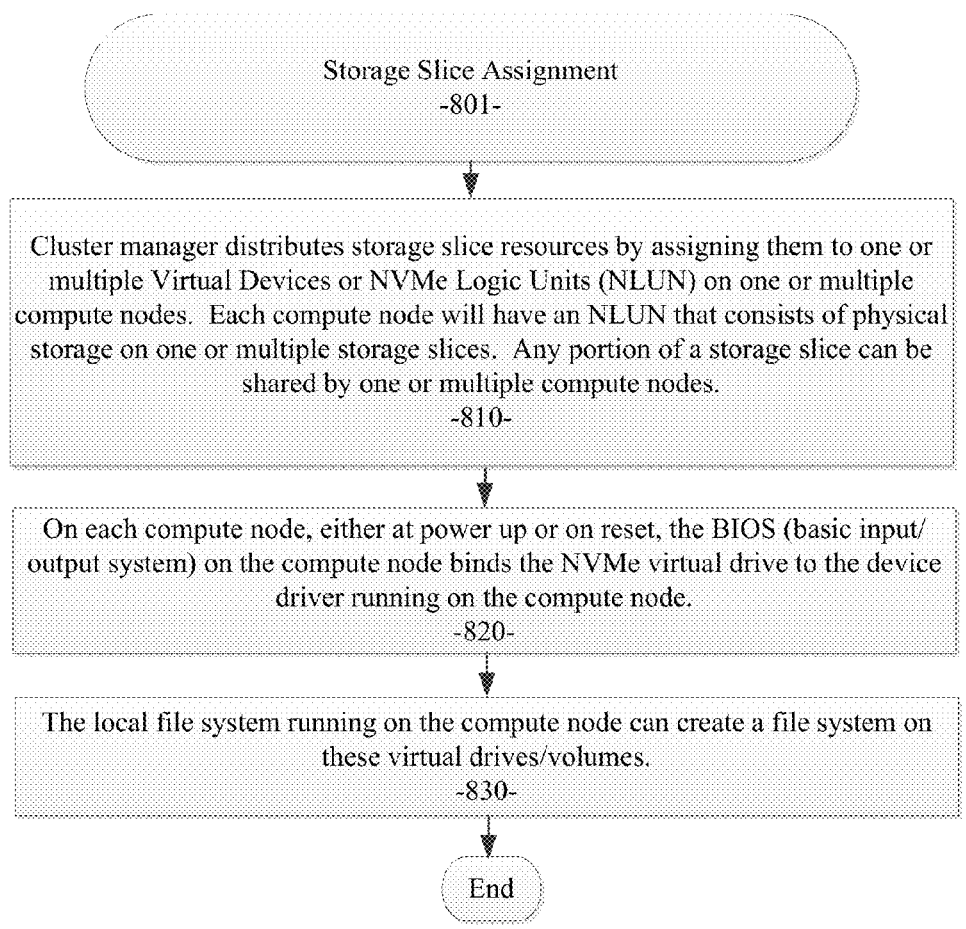
FIG. 9 illustrates a procedure for assigning storage slices to compute nodes with NVMe (non-volatile memory express) storage.

FIG. 9 illustrates a procedure 801 for assigning storage slices to compute nodes with NVMe storage. The procedure includes a cluster manager that distributes storage slice resources by assigning them to one or multiple Virtual Devices or NVMe Logic Units (NLUN) on one or multiple compute nodes. Each compute node will have an NLUN that consists of physical storage on one or multiple storage slices. Any portion of a storage slice can be shared by one or multiple compute nodes (processing block 810). In a particular embodiment, the storage slice, represented by a combination of NVMe storage devices and a corresponding storage controller, can be identified using a media access control address (MAC address). On each compute node, either at power up or on reset, the BIOS (basic input/output system) on the compute node binds the NVMe virtual drive to the device driver running on the compute node (processing block 820). The local file system running on the compute node can create a file system on these virtual drives/volumes (processing block 830).

Referring again to FIG. 7, a switched DAS architecture of an example embodiment allows multiple compute nodes to have access to storage slices from different storage containers to increase the data accessibility in the presence of hardware failures. As an example, three compute nodes (902, 904, and 906) are shown in FIG. 7. Each of these compute nodes can be assigned with storage slices (912, 914, and 916), respectively, from two different storage containers 920 and 930.

Each of the storage containers 920 and 930 and compute nodes (902, 904, and 906) can be configured with the location of the physical hardware. Storage container to compute node assignment can use the physical location as required to manage the data accessibility in the presence of hardware failures. The same architecture, implemented with an Ethernet infrastructure as described herein, can be extended to use protocol specific identifiers and assignment with SAS/SATA protocols connected over an SAS expander, and SOP protocol connected over a PCIe switch.

Device Management

Figure 10:
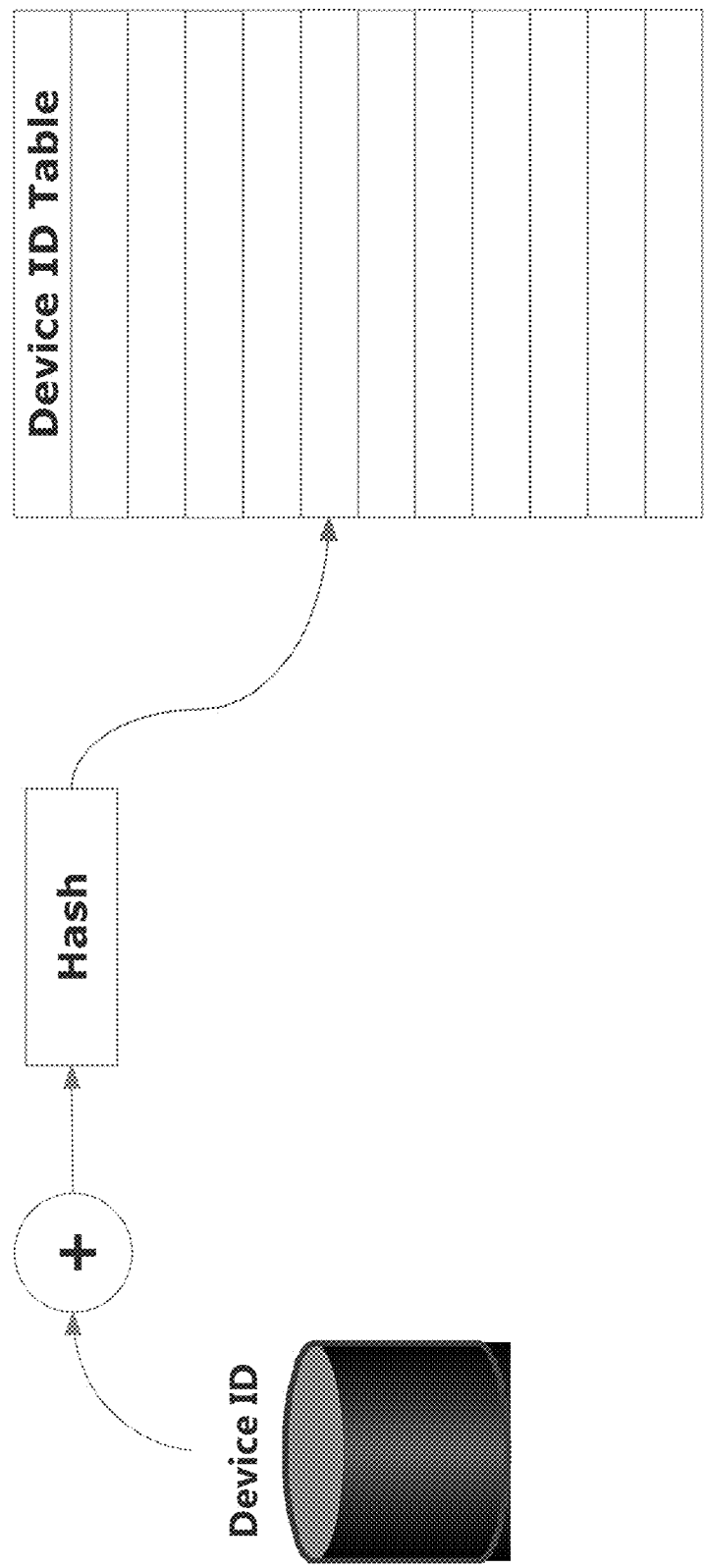
FIG. 10 illustrates the process in an example embodiment for device management.

FIG. 10 illustrates the process in an example embodiment for device management. A switched DAS storage system with a pool of readily available driver shelves allows the flexibility of removing and adding storage to the pool of drives. This type of system needs to track each drive as they get moved throughout the system and identify them as unique.

In an example embodiment as shown in FIG. 10, when a new drive is added to a cluster or a cluster is created, a hash is calculated based on a unique device identifier (ID). This hash is used to address into a device ID table. The table entry is marked as being occupied and the device ID is placed into the table. This is shown in FIG. 10. The table has additional information along with the Device ID to identify the device location within the switched. DAS storage network.

If a drive is removed and then added back to the storage pool in a different location, the hash is again calculated to address into the Device ID Table. This time, the entry of the table is found to not be empty and the Device ID matches. The physical information of the new location of the device is added to the table.

When a drive that has otherwise been functioning as part of the storage pool is removed, the management entity of the local storage controller will hash into the device ID table removing the special location of the device from the table, but leaving the Device ID information in the table so the device can be identified if the device is returned to the storage pool.

Data Flow

Figure 11:
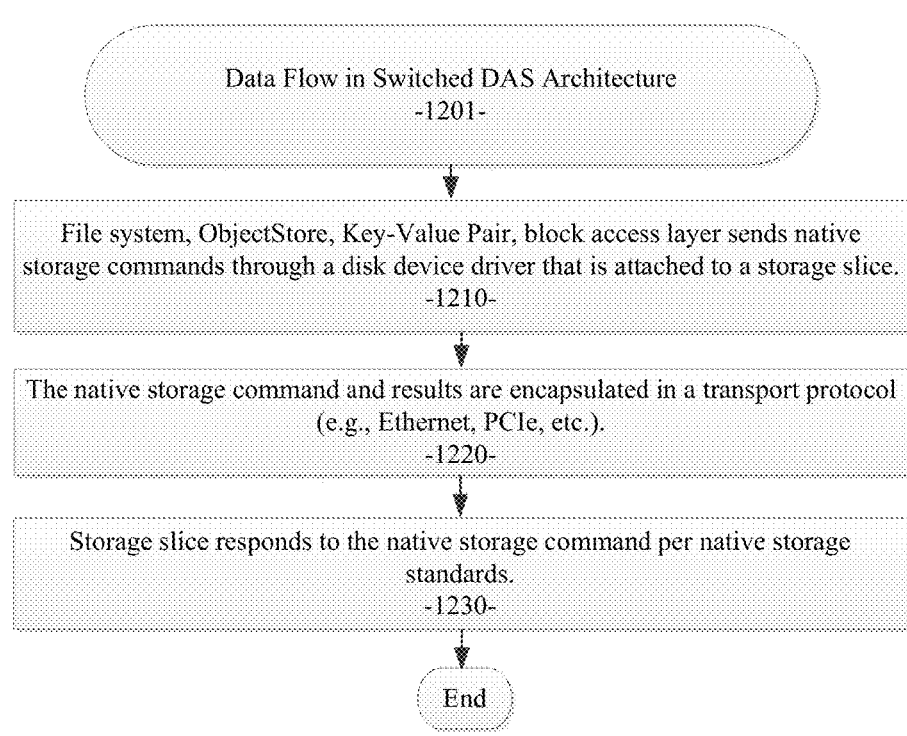
FIG. 11 illustrates the procedure in an example embodiment for data flow from a compute node to one or more storage slices.

FIG. 11 illustrates the procedure 1201 in an example embodiment for data flow from a compute node to one or more storage slices. In the procedure of the example embodiment, a file system or block access layer sends native storage commands through the disk device driver that is attached to a storage slice (processing block 1210). The native storage command and results are encapsulated in a transport protocol (e.g., Ethernet, PCIe, etc.) per the respective protocols. The storage slice responds to the native storage command per native storage standards.

Sharing of Storage Media

Figure 12:
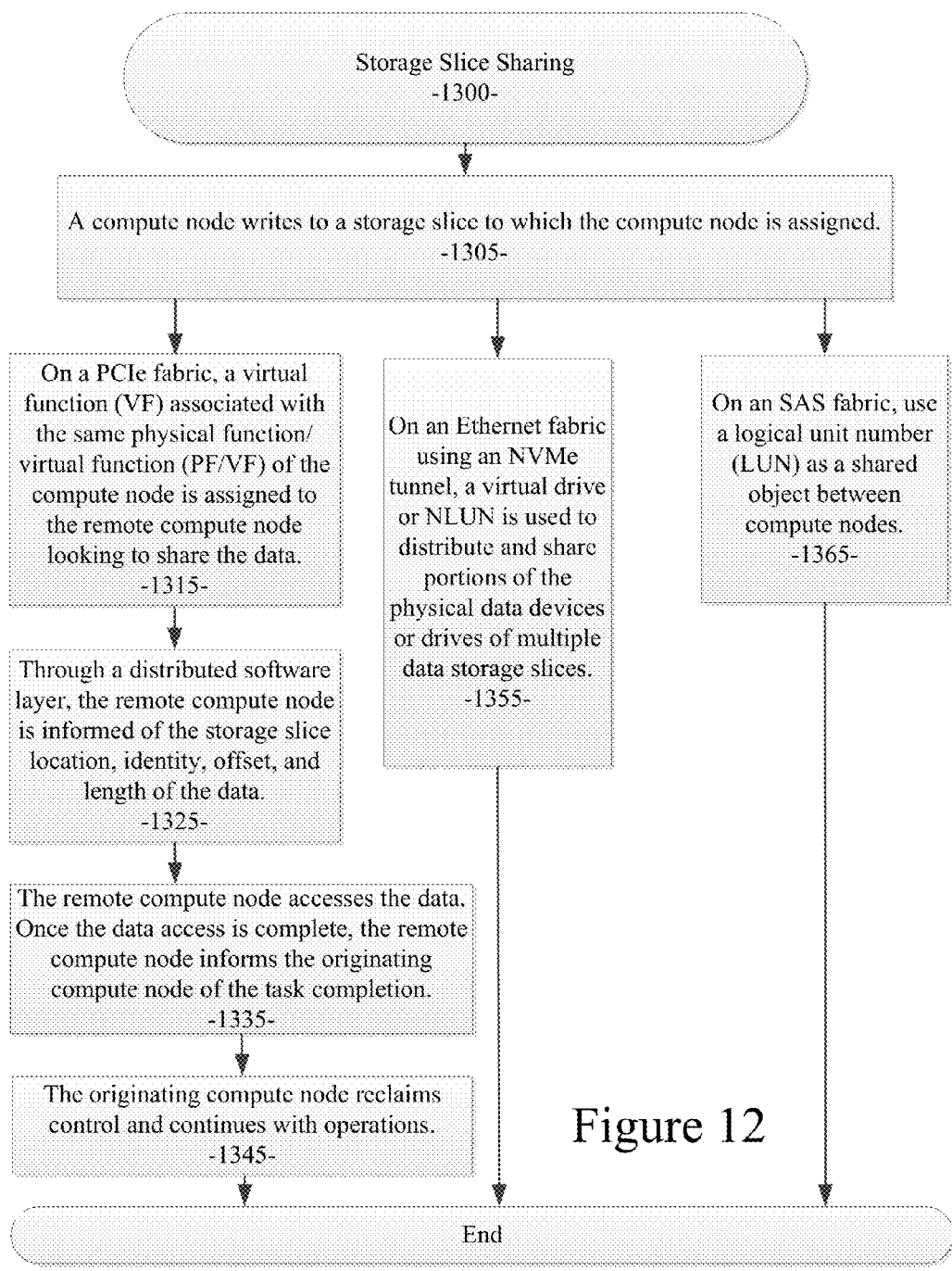
FIG. 12 illustrates the procedure in an example embodiment for storage slice sharing.

FIG. 12 illustrates a procedure 1300 in an example embodiment for storage slice sharing. In the procedure of the example embodiment, the compute node writes to the storage slice to which it is assigned (processing block 1305). On a PCIe fabric, a virtual function (VF) associated with the same physical function/virtual function (PF/VF) of the compute node is assigned to the remote compute node looking to share the data (processing block 1315). Through a distributed software layer, the remote compute node is informed of the storage slice location, identity, offset, and length of the data (processing block 1325). The remote compute node accesses the data. Once the data access is complete, the remote compute node informs the originating compute node of the task completion (processing block 1335). The originating compute node reclaims control and continues with operations (processing block 1345). On an Ethernet fabric using an NVMe tunnel, a virtual drive or NLUN is used to distribute and share portions of the physical data devices or drives of multiple data storage slices (processing block 1355). On an SAS fabric, a logical unit number (LUN) is used as a shared object between compute nodes (processing block 1365).

One of the key advantages of centralizing storage media is to enable dynamic sharing by cooperating compute nodes. The switched DAS architecture of the example embodiments enables this feature.

Switched DAS Using Ethernet

Referring again to FIGS. 6 through 8 and 13 through 14, the example embodiment shows a basic data storage configuration that represents the common compute and storage interconnection scheme. The various example embodiments described herein use this basic topology and improve the way that data is moved through the system. The improvements lead to a drastic improvement in overall system performance and response time without impacting system reliability and availability. The disclosed architecture reduces protocol layers in both the compute server and storage device end of the system.

The architecture of the various example embodiments described herein eliminates complicated high latency IP (Internet Protocol) based storage protocol and its software based retries with long IO (input/output) time-outs. These protocols are used to work around Ethernet's lossy nature to create a reliable storage protocol.

The architecture of the various example embodiments described herein uses a data store switch fabric 160 to tunnel directly between nodes using server-based 10 protocols across the network, resulting in directly exposing high performance storage devices 171 to the network. As a result, all the performance of the storage devices is made available to the network. This greatly benefits the compute server applications.

Figure 13:
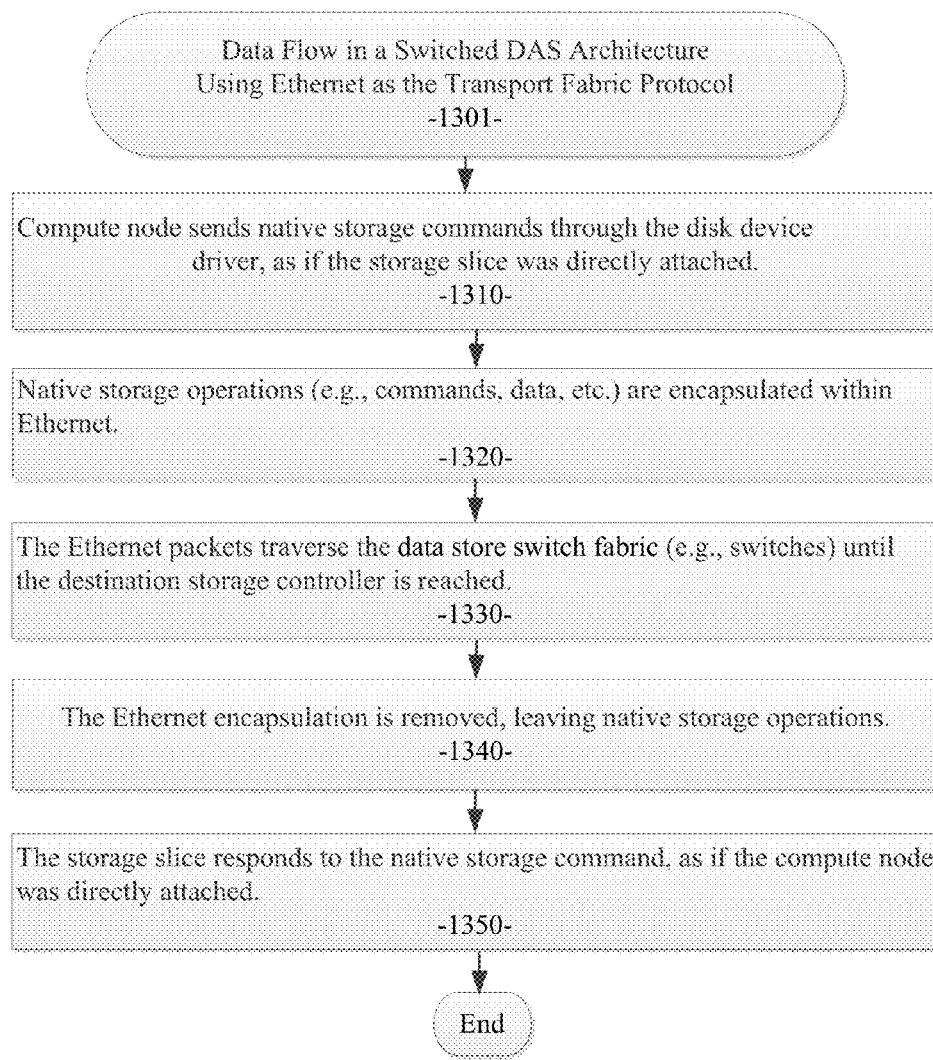
FIG. 13 illustrates the data flow in a switched DAS architecture of an example embodiment using Ethernet as the transport fabric protocol.

FIG. 13 illustrates a data flow 1301 in a switched DAS architecture of an example embodiment using Ethernet as the transport fabric protocol. Referring to FIG. 13, at the compute server 150 end, an IO operation is initiated in the same manner as if the storage device 171 were internal to the compute server 150. Compute node sends native storage commands through the disk device driver, as if the storage slice was directly attached (processing block 1310). This IO operation, data request, or native storage operation (e.g., commands, data, etc.) gets encapsulated in an Ethernet frame (processing block 1320). The Ethernet frame is then shipped via the data store switch fabric 160 to a storage device 171 at the other end of the network (processing block 1330). At the storage end of the network transaction, the Ethernet tunnel is undone, the Ethernet encapsulation is removed, leaving native storage operations, and the IO protocol is passed to the storage device 171 as if the storage device 171 were connected via a direct method to the compute server 150 (processing block 1340). The storage slice responds to the native storage command, as if the compute node was directly attached (processing block 1350). As a result, the data store switch fabric 160 enables data communications between a plurality of compute nodes 150 and the plurality of data storage devices 171 in a manner to emulate a direct data connection. In an example embodiment, the storage device 171 can be solid-state drive (SSD). A solid-state drive (SSD) is a type of data storage device, such as a flash memory device, which uses memory technology rather than conventional rotating media. The encapsulation of IO operations into a standards based Layer 2 Ethernet frame is shown in FIG. 14.

Figure 14:
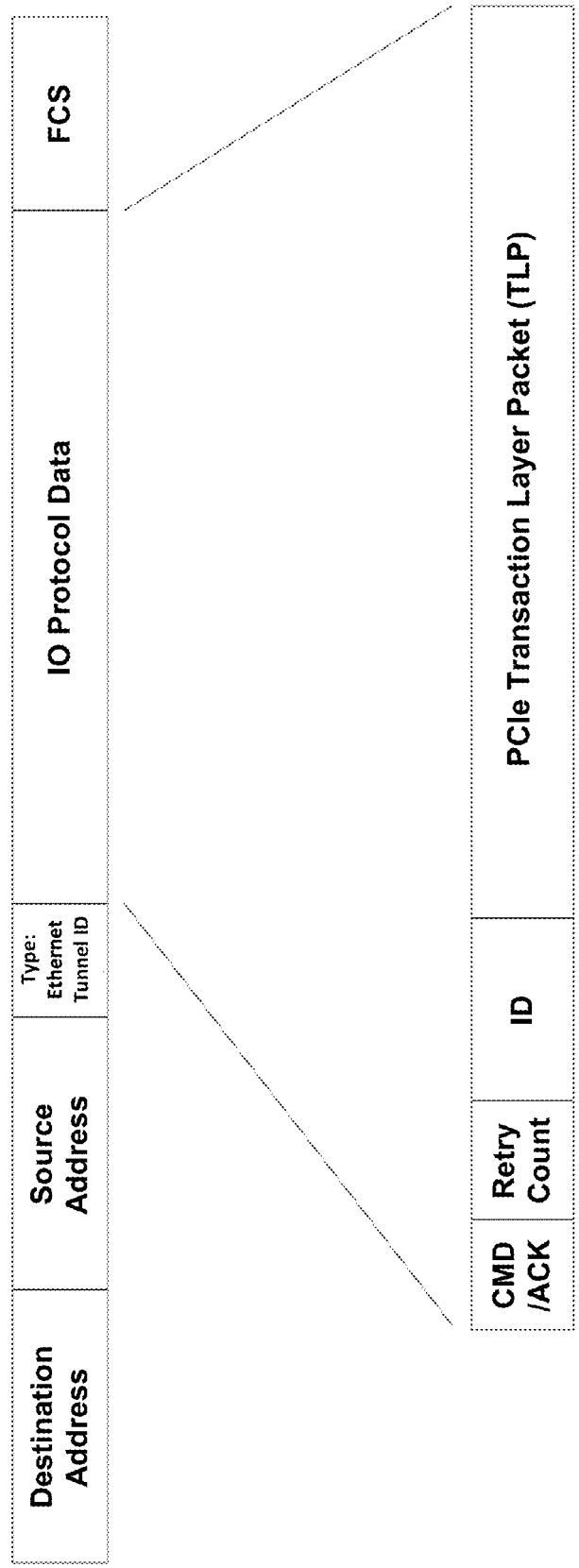
FIG. 14 illustrates the encapsulation of an IO operation into a standard Ethernet frame in an example embodiment.

Referring to FIG. 14, the encapsulation of an IO operation into a standard Ethernet frame is shown. The architecture of the example embodiment uses standard Ethernet protocol as an integral part of the storage system of a particular embodiment. As a result, it is extremely efficient and effective to use VLAN (virtual local area network) features to segregate and prioritize the storage traffic that is built with Ethernet as its core fabric. It will be apparent to those of ordinary skill in the art in view of the disclosure herein that many other alternative implementations can be used to segregate and prioritize storage traffic. The architecture of the example embodiment can utilize information available in the creation of the IO traffic where the tunnel is constructed to decide how to prioritize or segment the Ethernet flows. The architecture also provides a hardware-based packet loss detection and recovery feature. Moving the packet loss detection and recovery to a fast, close-to-the-network mechanism improves the performance of the overall system over previous implementations.

Storage Processing on Application Servers, with External Switch DAS

Referring again to FIGS. 6 through 8, the example embodiment provides a very novel approach with significant benefits over today's storage architectures. Due to the high performance and small form factor of solid state memory devices currently on the market, old methods of external storage based on devices behind a single controller or banks of IO controllers, typically Intel® based motherboards, are too costly and woefully under provisioned.

This result of overpriced and underperforming external data storage solutions led to a transition in the data center. Compute users moved storage internal to the compute or application servers. This solved the cost and performance issues they were experiencing with external storage. It worked great in smaller configurations. However, it is exceedingly difficult to support large compute environments with internal storage. Scaling storage independent of the compute environment is problematic. The density of the compute cluster is not optimal when placing storage in a server. Finally, the cost and performance of solid state devices is high enough that trapping devices in a single server, which is the least reliable portion of the system, is not cost effective and reduces overall system reliability.

The data storage architecture of an example embodiment described herein moves the SAN/NAS type of storage processing software onto the compute nodes. This removes both cost from the system as well as performance bottlenecks of the external SAN/NAS or object storage architecture. However, the architecture of the example embodiments utilizes externally switched DAS storage that exposes the performance of the drivers directly to a storage network. This allows for SAN/NAS type reliability, manageability, and availability that internal storage cannot offer. Removing storage from the compute servers now allows the compute environment and storage to scale independently. The removal of storage from the compute server allows for a more dense performance point. The density of the distributed storage solution of the example embodiments is far greater than that of internal storage, thereby reducing both power and footprint of the implementation.

Platform Software Architecture

The various example embodiments provide technology and a software platform for: instrumentation hooks to monitor, measure, and enforce performance metrics into the compute, memory, network and storage resources; and continuous monitoring of the health of all resources to predict failures and proactively adjust/update the cluster resources. Details of the software platform in an example embodiment are provided below.

Instrumentation Hooks to Monitor, Measure, and Enforce Performance Metrics into the Compute, Memory, Network and Storage Resources.

Figure 15:
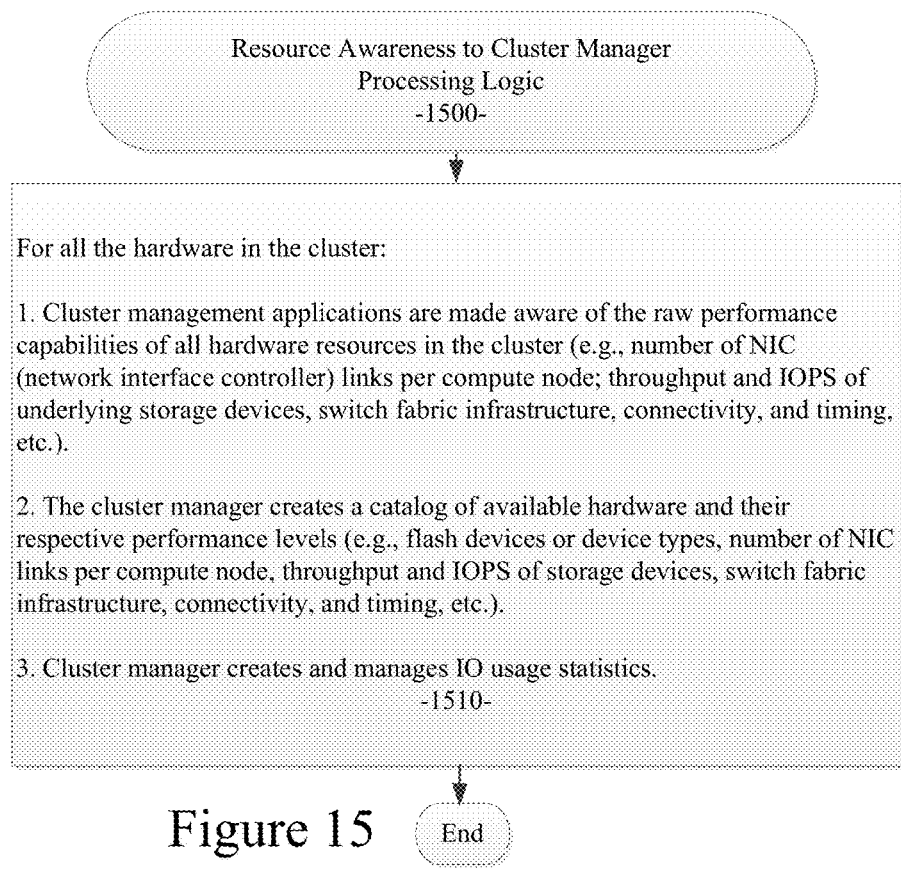
FIGS. 15 and 16 illustrate an example embodiment for implementing instrumentation hooks to monitor, measure, and enforce performance metrics into the compute, memory, network and storage resources.
Figure 16:
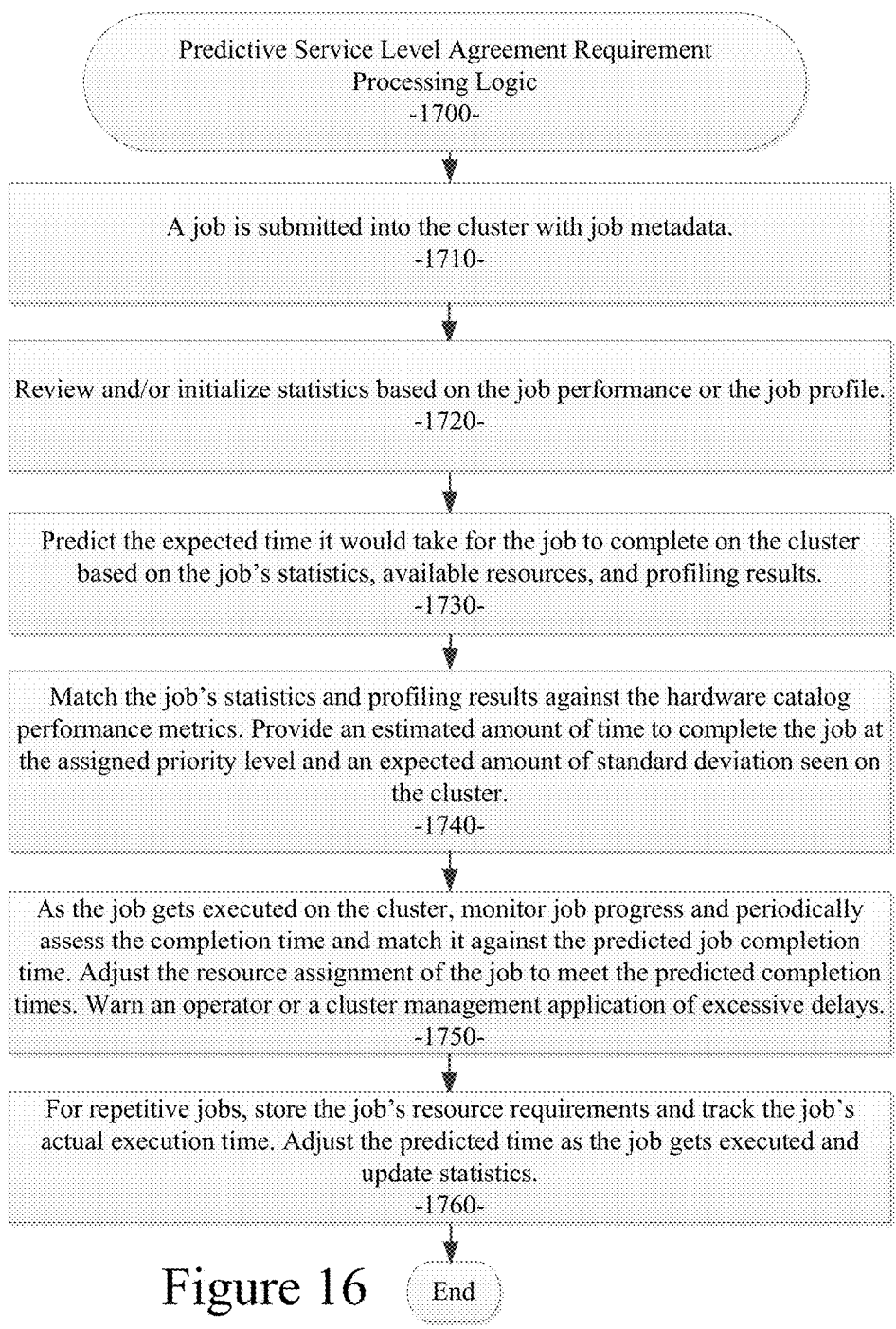

Referring to FIGS. 15 and 16, a first step in an example embodiment is to perform resource awareness flow. This includes creating a catalog of available hardware and their respective performance levels (e.g., flash devices or device types, number of NIC links per compute node, throughput and IOPS of storage devices, switch fabric infrastructure, connectivity, and timing, etc.). A second step is to perform predictive Service Level Agreement (SLA) requirement analysis. All resources that are required to run a job are virtualized, namely Central Processing Unit (CPU), memory, network, and storage. Jobs can be implemented as Hadoop jobs. Hadoop is a well-known open-source software framework from Apache Software Foundation for storage and large-scale processing of data-sets on clusters of commodity hardware. Apache Hadoop is a registered trademark of the Apache Software Foundation. Platform software is made aware of the performance capabilities such as throughput, IOPS (input/output operations per second), latency, number of queues, command queue-depth, etc. of all the underlying hardware resources in the storage platform. The platform software will run matching algorithms to align the resource usage of a specific job against the hardware capabilities, and assign virtualized resources to meet a specific job. As cluster usage changes, the platform software continuously maps delivered SLAs against predicted SLAs, and adjusts predicted SLAs.

A job's execution time for a job "j" is predicted based on: Tj=f (# of phases in the job, # of datasets the job is using, # of sub-task datasets the job will be split into, # of processing units assigned for the job, # of memory bytes assigned for the job, the worst case time for each of the sub-tasks, the average delay between phases, the average network throughput, the average disk throughput, the average disk input/output (TO) operations, etc.).

Referring now to FIG. 15, an example embodiment illustrates a process 1500 to perform resource awareness flow. For all the hardware in the cluster: 1) cluster management applications are made aware of the raw performance capabilities of all hardware resources in the cluster (e.g., number of NIC (network interface controller) links per compute node; throughput and IOPS of underlying storage devices, switch fabric infrastructure, connectivity, and timing, etc.); 2) the cluster manager creates a catalog of available hardware and their respective performance levels (e.g., flash devices or device types, number of NIC links per compute node, throughput and IOPS of storage devices, switch fabric infrastructure, connectivity, and timing, etc.); and 3) the cluster manager creates and manages 10 usage statistics (processing block 1510).

Referring now to FIG. 16, an example embodiment illustrates a process 1700 to perform predictive service level agreement requirement processing. In an example embodiment, a job is submitted into the cluster with job meta data (processing block 1710). The process can review and/or initialize statistics based on the job performance or the job profile (processing block 1720). The process can predict the expected time it would take for the job to complete on the cluster based on the job's statistics, available resources, and profiling results (processing block 1730). The process can match the job's statistics and profiling results against the hardware catalog performance metrics and provide an estimated amount of time to complete the job at the assigned priority level and an expected amount of standard deviation seen on the cluster (processing block 1740). As the job gets executed on the cluster, the process can monitor job progress and periodically assess the completion time and match it against the predicted job completion time. The process can adjust the resource assignment of the job to meet the predicted completion times. The process can warn an operator or a cluster management application of excessive delays (processing block 1750). For repetitive jobs, the process can store the job's resource requirements and track the job's actual execution time. The process can adjust the predicted time as the job gets executed and update statistics (processing block 1760).

Figure 17:
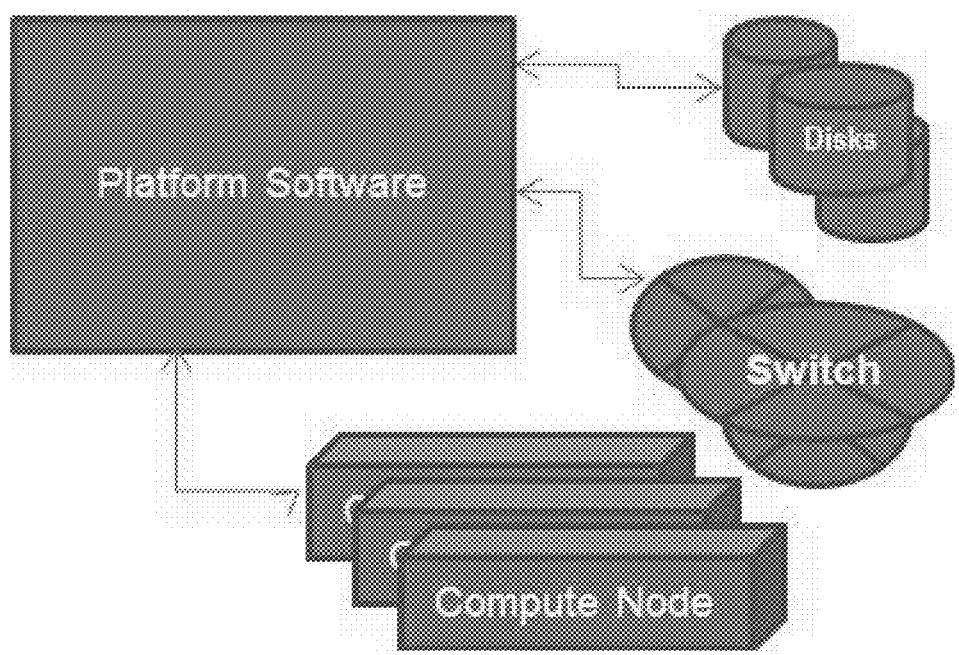
FIGS. 17 and 18 illustrate an example embodiment for continuous monitoring of the health of all resources to predict failures and proactively adjust/update the cluster resources.
Figure 18:
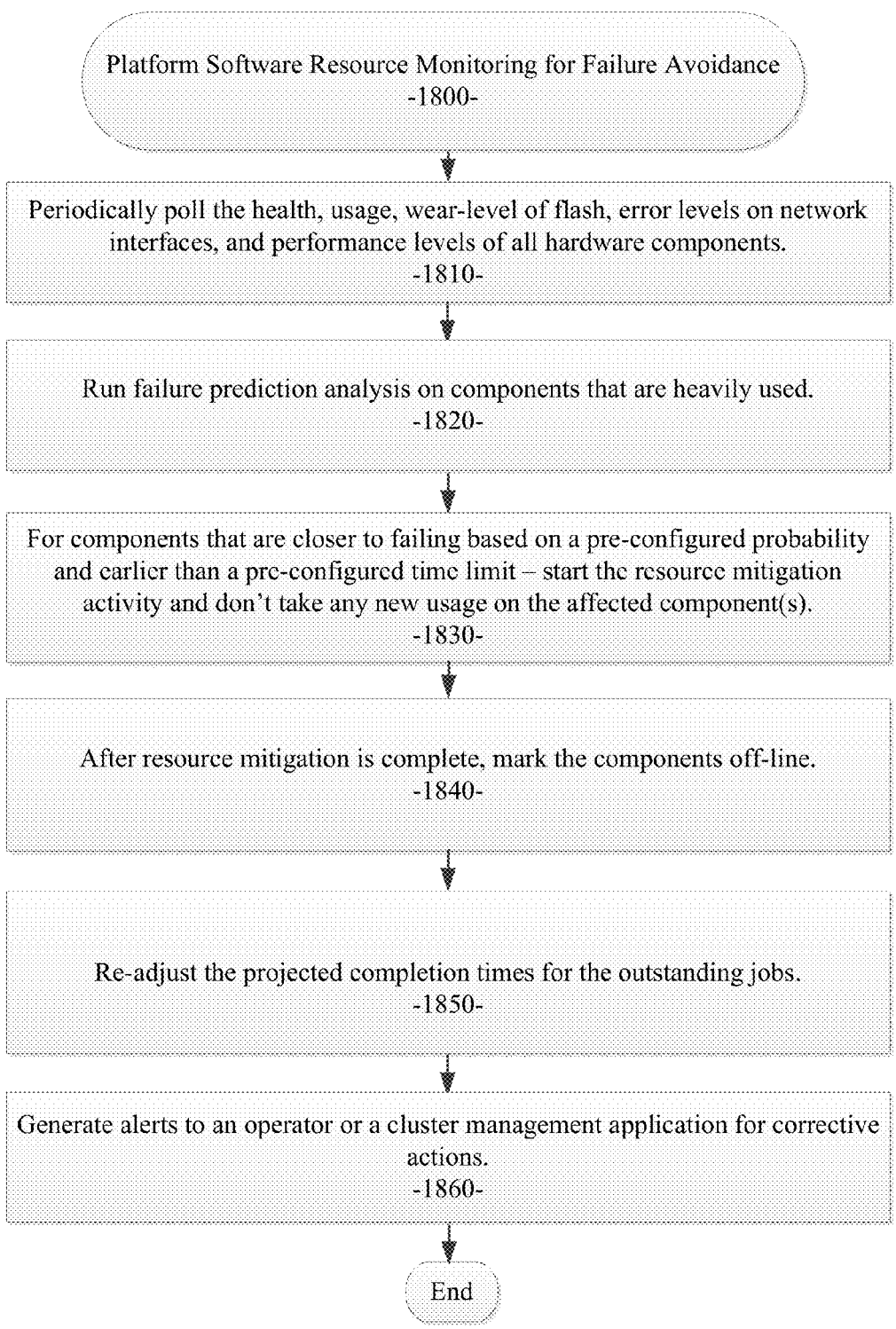

Continuous Monitoring of the Health of all Resources to Predict Failures and Proactively Adjust/Update the Cluster Resources Referring to FIGS. 17 and 18, the platform software of an example embodiment continuously monitors the health of all critical hardware components across various compute nodes and storage containers. The system also performs resource monitoring to avoid failures. Platform software is made aware of the failure characteristics such as wear-levels of flash storage, failure ratings of power supplies, fans, network and storage errors, etc. of all the underlying hardware resources in the storage platform. The platform software implements hooks to monitor the health of hardware resources into the respective software control blocks. The platform software runs continuous failure models and proactively informs/alerts an operator or a cluster management application to attend/update the hardware resource that is in question. When a change in resource is imminent, the platform software proactively reduces the usage of affected hardware, rebalances the storage, network and compute tasks, and isolates the affected hardware for quick and easy replacement.

Referring to FIG. 18, an example embodiment illustrates a process 1800 to perform platform software resource monitoring for failure avoidance. In the process of an example embodiment, the platform software periodically polls the health, usage, wear-level of flash, error levels on NIC interfaces, and performance levels of all hardware components (processing block 1810). The process runs failure prediction analysis on components that are heavily used (processing block 1820). For components that are closer to failing based on a pre-configured probability and earlier than a pre-configured time limit—start the resource mitigation activity and don't take any new usage on the affected component(s) (processing block 1830). After resource migration is complete, the process automatically marks the affected components as off-line (processing block 1840). Then, the process automatically re-adjusts the projected completion times for outstanding jobs (processing block 1850) and generates alerts to an operator or a cluster management application for any needed corrective actions (processing block 1860). In an alternative embodiment, areas of the flash drives which are showing high levels of wearing (or bad cell sites) can be used for the storage of lightly written data (e.g., cold data storage). In this manner, the worn areas of the flash drives can still be used without wasting storage.

Input/Output (IO) Acceleration Using an Ethernet Connection

Figure 19:
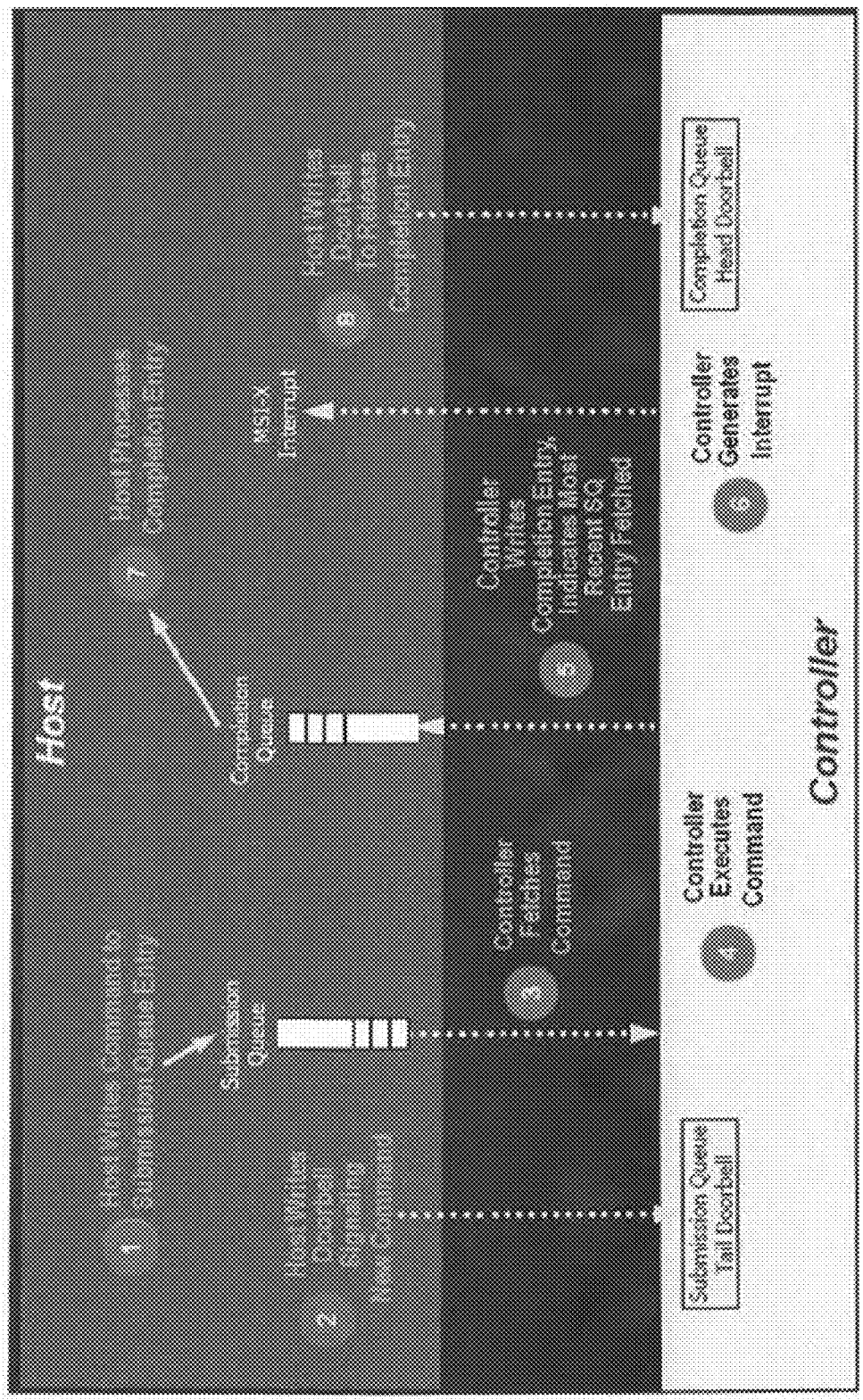
FIG. 19 illustrates the standard NVM Express 1.1 specification wherein an example embodiment implements input/output (IO) acceleration by use of an Ethernet connection.

Referring to FIG. 19, the example embodiment shows the standard NVM Express 1.1 specification. Step 2 of the IO flow shown in FIG. 19 identifies a host write of a doorbell. When this occurs, the Host NIC 156 (network interface controller shown in FIG. 6) of an example embodiment forwards the doorbell down the Ethernet connection of the data store switch fabric 160 to the storage controller 172 as shown in FIGS. 6 and 8 where the doorbell eventually gets passed to the storage device 171 (e.g., a flash drive or other SSD). At the same time, the Host NIC 156 acts on the doorbell and fetches the command from the Submission Queue as identified in step 3 of FIG. 19. The Host NIC can start to process the command before the storage device has seen the command. The Host NIC 156 can send the relevant information across the data store switch fabric 160 (e.g., the Ethernet connection) to the storage controller 172. When the storage device 171 sees the doorbell, the head information of the command has already been fetched and is either on the way or has arrived in the local packet buffer or the storage controller 172. This method of prefetching commands and data and overlapping processing operations effectively hides latency and improves performance of the IO system. Additionally, by being IO aware, the hardware can handle the lossy nature of Ethernet and more reliably handle packet drops.

Input/Output (IO) Virtualization Layer in an Ethernet Environment

Referring again to FIG. 6, the example embodiment shows the basic system interconnect where a Host 150 with an Ethernet NIC 156 is connected via an Ethernet connection infrastructure of data store switch fabric 160, which is then connected to an Ethernet based storage controller 172. The storage controller 172 is connected to an SSD 171. This is the basic physical configuration of the storage system of an example embodiment. The Host NIC 156 presents a virtual SSD to the server 150. The storage controller 172 presents a virtualized root complex to the SSD 171. As such, the Host NIC 156 presents an endpoint to the compute node 150. The storage protocol is tunneled across the Ethernet connection infrastructure. Tunneling the protocol limits the complexity, power and latency of the Host NIC 156 and storage controller 172. The virtualization allows any host to be able to communicate to any number of storage controllers to utilize a portion of or the entire addressable space of the SSDs to which it is connected. Virtualizing the devices allows the example embodiments to use host resident storage management software 155 that can then implement features common to enterprise SAN and NAS systems at a much higher performance level, lower power level, and lower system cost.

Messaging Protocol

A low latency reliable secure messaging protocol is an important part of the data storage architecture described herein. The messaging protocol provided in an example embodiment uses the same connectivity infrastructure that customer IO operations use. The architecture of the protocol permits a responding compute server to directly send indexes and meta data to the locations where a requesting compute server will use the data, eliminating any memory copies. This saves valuable system bandwidth as well as increasing storage software performance. The messaging protocol also reduces system response latencies. Performance is also optimized as hardware can snoop the message entries while moving the data to obtain information used to ensure the memory integrity of the system receiving the indexes and meta data, thereby eliminating another queue or table.

Figure 20:
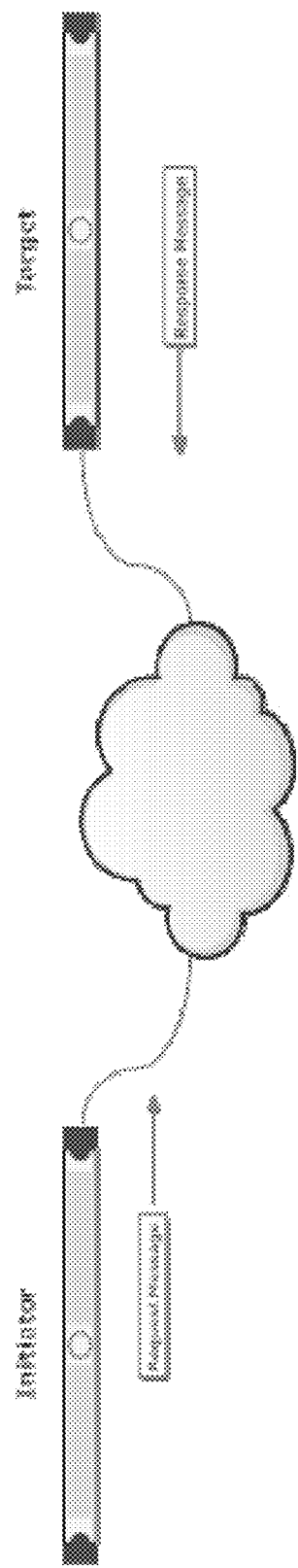
FIG. 20 illustrates a server to server configuration of the messaging protocol of an example embodiment.

FIG. 20 illustrates a compute server to compute server configuration of the messaging protocol of an example embodiment. As described above, compute nodes or servers can be in data communication with each other via a local area network 165. The messaging protocol of an example embodiment can be used to facilitate this data communication. As described herein, the term Initiator is used to identify the server that is sending a Request Message to get information from a Target server that sends a Response. As described herein, a response is a generic term for the data that is being used by the storage system software of an example embodiment. This data can include index data or other meta data or system status. In the example embodiment, the messaging protocol described herein is a peer to peer (P2P) protocol. As a result, any server in the compute environment can and will be initiator and a target of the message passing protocol based on the needs of the systems at the time a conversation starts.

Figure 21:
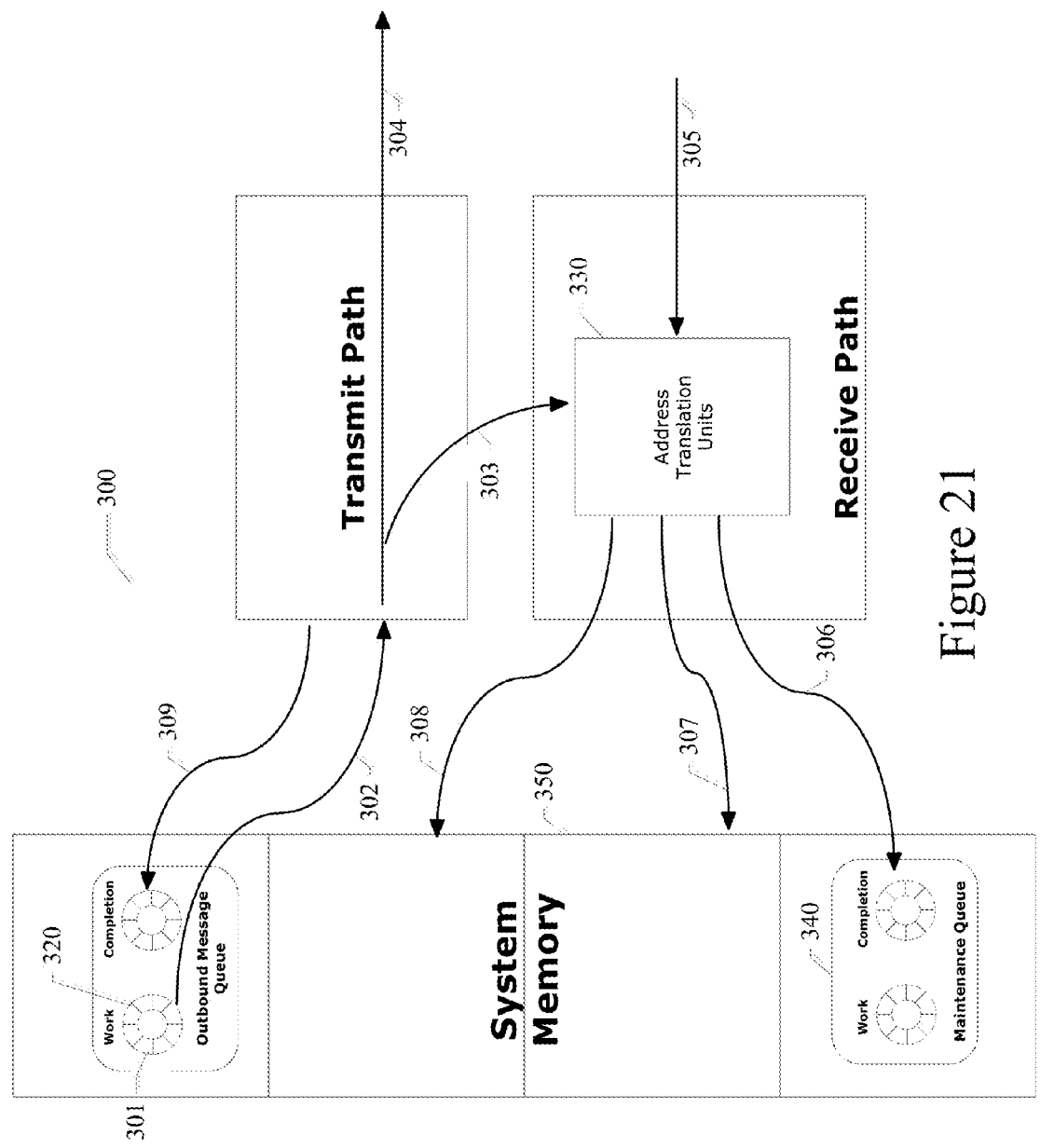
FIG. 21 illustrates the data flow for a sample message using the messaging protocol of an example embodiment.

Referring to FIG. 21, the data flow 300 for a sample message using the messaging protocol of an example embodiment is illustrated. The Initiator starts 301 a conversation by placing an entry into a work queue 320. The initiator then rings a doorbell telling the target a work queue entry is available. Next, the Target reads 302 the work queue entry. A side effect 303 of the work queue entry read moves check information into the Address Translation Unit (ATU) 330 of the hardware. The Target receives 304 the work queue entry, processes the work queue entry, and builds the appropriate response packet. The response packet is then sent 305 to the Initiator where the response packet is processed by the Address Translation Unit (ATU) 330. If there is no active check information matching an ATU 330 context for the response, then the message will be routed 306 to the Maintenance Queue 340 and a Completion message will be posted by hardware. If the check information for the response matches an active ATU 330 context, then the response will be routed 307 to the appropriate system memory location in system memory 350. Multiple response messages can be sent 308 during one ATU 330 context depending on the rules set captured by the ATU 330 from the hardware portion of the original request message entry. The ATU 330 has a context and is dynamic in nature. The ATU 330 can be opened and then closed as the message conversations start and then complete. At the end or completion of a conversation, a completion queue entry is written 309. Depending on the conversation, there could be multiple completion queue entries.

Feature Offloads in an Ethernet Environment

Referring again to FIG. 6, the example embodiment shows the basic structure of distributed storage network connectivity in an example embodiment. The example embodiment utilizes this network topology to implement storage features without impacting the compute servers and the links to the compute servers. Examples of these features include mirroring disks and building or rebuilding replicas of drives. Again, this is all done independently of the compute servers. This saves valuable bandwidth resources of the compute servers. These features also increase overall storage performance and efficiencies as well as lower the overall power of the storage implementation.

Another class of offloads, which offload the processing burden of the compute cluster of servers, allows the compute servers to write to a single data storage replica and have this storage device automatically move the updated data to a designated replica within the storage network. This effectively eliminates the need to write to both the primary and the secondary storage device of a replica pair. A variation of the single write to a replica pair is to write two pieces of the updated information to each replica. The storage devices finish the transaction by sending the updated data they received to their mirrored device. This type of write method frees up bandwidth on specific links to the compute servers by allowing each transaction to go down a different path to the network. In a particular embodiment, multicast Ethernet packets can be used to send the same data to multiple destinations.

Storage Processing on Application Servers with External Switch DAS

Figure 22:
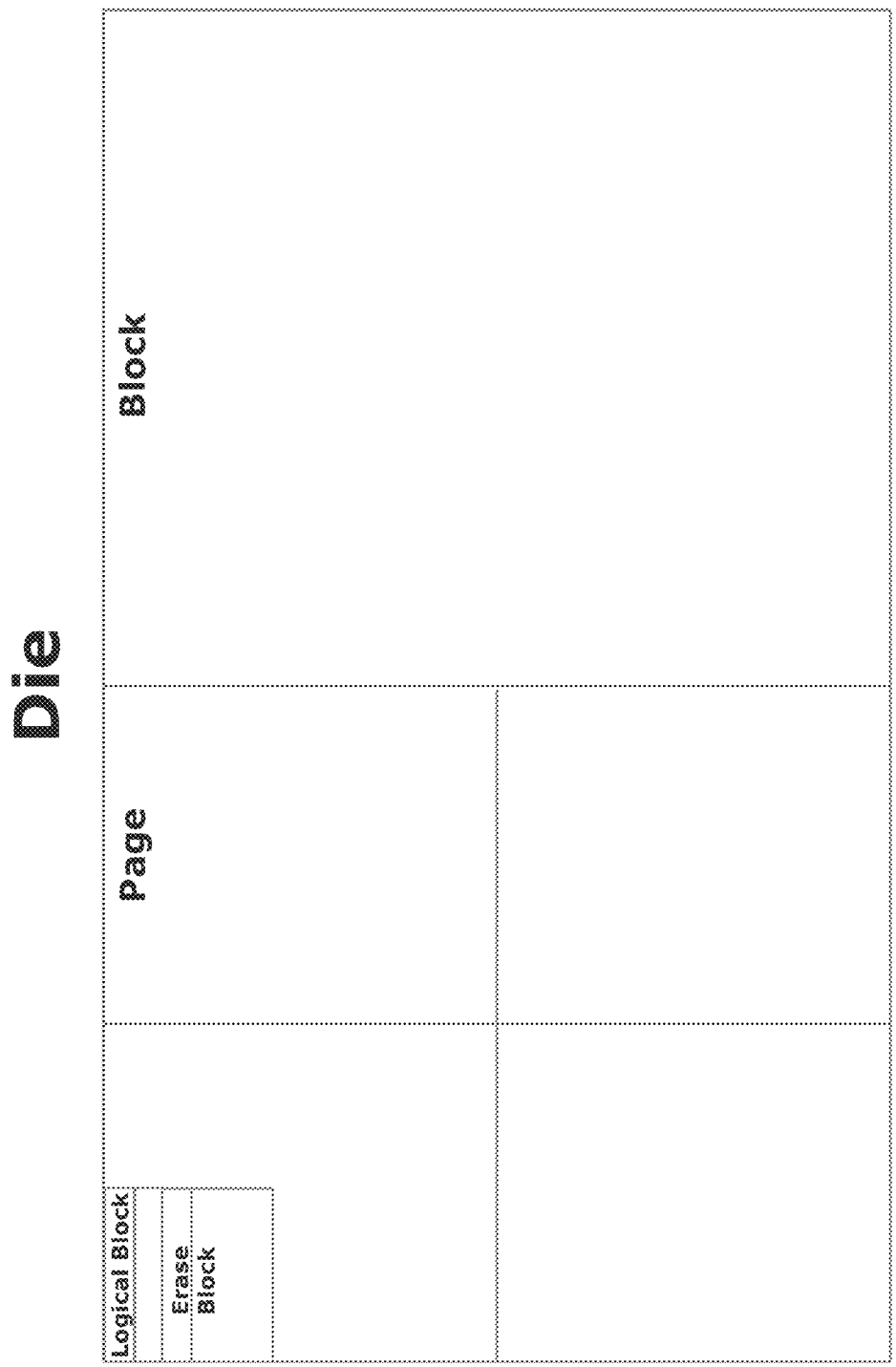
FIG. 22 shows the basic organization of the current flash media.

FIG. 22 shows the basic organization of the current flash media. An enterprise class SSD is made up of many assembled chips of flash devices. The devices could be assemblies of multiple die in one package. Each die is made up of multiple blocks with many pages per block. The memory is address at a logical block boundary. Flash media is a media that does not allow direct writes. If new data is to be written, a blank area must be found or an existing area must be erased. The unit of space that is bulk erased at one time is generally called the erase block. Because of this lack of direct write capability for this type of memory device, there is a management overhead. This management overhead includes managing the logic data blocks as virtual in that they don't exist in a specific physical location; but, over time are moved around the physical memory as various writes and reads occur to the die. Additionally, the media will wear out over time. Spare area is maintained to allow for user physical locations to fail and not lose user data.

The organization of the blocks, pages, logical blocks, and erase blocks vary from generation to generation and vendor to vendor. The characteristics of the media will vary in an even greater manner as new non-volatile memory technologies appear.

As described herein, an example embodiment provides an IO layer that virtualizes the storage from the application or operating system and then optimizes that storage to get the best performance out of the media, particularly flash memory devices. The example embodiment enables the implementation to avoid the performance pitfalls, which can occur when the media is not used optimally.

With one interface, users can get the best out of flash memory devices from different generations of flash memory devices, different vendors, different drives, and even different non-volatile technology. This virtualization software layer that is flash memory device aware formats the physical media to optimize writes so as to limit the need for the flash memory devices to perform garbage collection. This is done by ensuring all files or records are flash erase bank aligned and a multiple of the erase bank size. Additionally, block size is a multiple of the erase bank size.

The ability to format a drive and write records with an erase buffer in mind also help reduce the need for spare pages. This frees up the pages from the spare pool and makes the pages available to customer applications. The example embodiment increases the density of a current flash device due to the optimized usage of the device. This creates a more cost effective solution for customers.

Input/Output (IO) Performance Optimizations Based on Workload

Today's storage stacks are developed to provide the optimal performance for an average IO and storage workload the system will see, or the user can force the system to use preferred settings. Some systems will allow the user to characterize their workloads and then the user can set the systems to use a given set of settings.

The various embodiments of the data storage system described herein are designed to enable adjusting to the IO traffic and storage characteristics as the traffic profile changes. The various embodiments can also be programmed to alert the operator or cluster management application when the traffic pattern is seen to cross preset limits. The various embodiments allow different segments of the storage to utilize completely different 10 and storage logical block settings to optimize performance.

The feature of adjusting the configuration of the IO stack and hardware to the measured IO & storage traffic is coupled with the knowledge of the flash media described above in connection with FIG. 22. This feature of the various embodiments provides customers with the best possible performance for the jobs they are running as they run them. This feature also addresses multi-tenant environments being run on the cluster.

Flash Awareness and Failure Avoidance

The various embodiments described herein maintain real-time knowledge statistics of flash drives, which allows the system to avoid failures. Areas of the flash drives which are showing high levels of wearing (or bad cell sites) can be avoided when writing data. The cell use and the latency are monitored to determine wear. To monitor wear, data can be re-allocated to alternate drives and the storage meta data maintained on the compute nodes can be updated.

As individual flash drives near preset wear leveling targets, data can be slotted to other drives and meta data updated. If the user selects this feature, data can also be moved to alternate SSD's autonomously when these target thresholds are crossed. In addition, areas of the flash drives which are showing high levels of wearing (or bad cell sites) can be used for the storage of lightly written data (e.g., cold data storage). In this manner, the worn areas of the flash drives can still be used without wasting storage.

Storage Meta Data Structure

Referring again to FIG. 6, the example embodiment shows a basic compute environment where compute servers are attached to storage devices. Applications can run on the servers and the application data as well as operating data can reside on the storage devices. The environment enables object storage devices to perform at comparable or greater levels to compute servers with internal storage and vastly outperform other methods of external storage devices and storage systems, such as SAN and NAS storage as described above. This improved efficiency frees up the user to independently scale the compute and storage needs of their compute clusters without adversely impacting the performance. The distributed object store will have unmatched performance density for cluster based computing with the availability features of SAN or NAS storage.

FIG. 23 shows the object tag format for the object store of the example embodiment. The type field is used to define what fields are present in the rest of the tag as some files are optional and some fields can be duplicated. This is done to enable and disable storage of each object stored. The object source is a network pointer to where the object resides in the network. This object source is generated to allow current commercial switches to locate the object source in an Ethernet network with hardware speed or the smallest possible latency. For a given IO command the object tag is used to move that IO command to the correct location for the command to be processed. After an IO command has been sent to the correct location for the IO command to be processed, the object locater field is used to find the data object the command is processing or accessing. Finally the object feature field is used to track any special requirement or actions an object requires. It is also used to determine any special requirements of the object. Agents can use this field to make decisions or perform actions related to the object.

Uses Cases of the Various Embodiments:

The Switched DAS architecture of an example embodiment has a wide variety of use cases. The following list presents a few of these use cases:

1. Using a distributed storage access layer across compute nodes—it could be used to build a scale-out cluster with centralized storage media to catering to Hadoop framework.
2. Using a distributed memory layer across compute nodes—it could be used to build a high-capacity shared memory running into 100's of terabytes (TB) and more.
3. Using a distributed block storage access layer across compute nodes—it could be used to provide a storage backend for RDBMS (relational database management system) applications addressing OLTP/OLAP (online transaction processing/online analytical processing) transactions.
4. Using a distributed object storage access layer across compute nodes—it could be used to build a scale-out cloud storage server.
5. Using a distributed storage access layer across compute nodes—it could be used to build a VDI (virtual device interface) hosting server farm with integrated storage.

FIG. 24 is a flow diagram illustrating the basic processing flow 401 for a particular embodiment of a switched direct attached shared storage architecture. As shown, an example embodiment includes: providing a plurality of compute nodes, each compute node having integrated compute capabilities, data storage, and a network interface controller (Host NIC), the plurality of compute nodes being in data communication with each other via a local area network, the plurality of compute nodes each including distributed storage processing software resident thereon (processing block 410); providing a plurality of physical data storage devices in data communication with a storage controller (processing block 420); and enabling data communications in a data store switch fabric between the plurality of compute nodes and the plurality of physical data storage devices via the Host NIC and the storage controller, the data store switch fabric encapsulating data requests from the plurality of compute nodes into data frames for transport to corresponding physical data storage devices (processing block 430).

Figure 25:
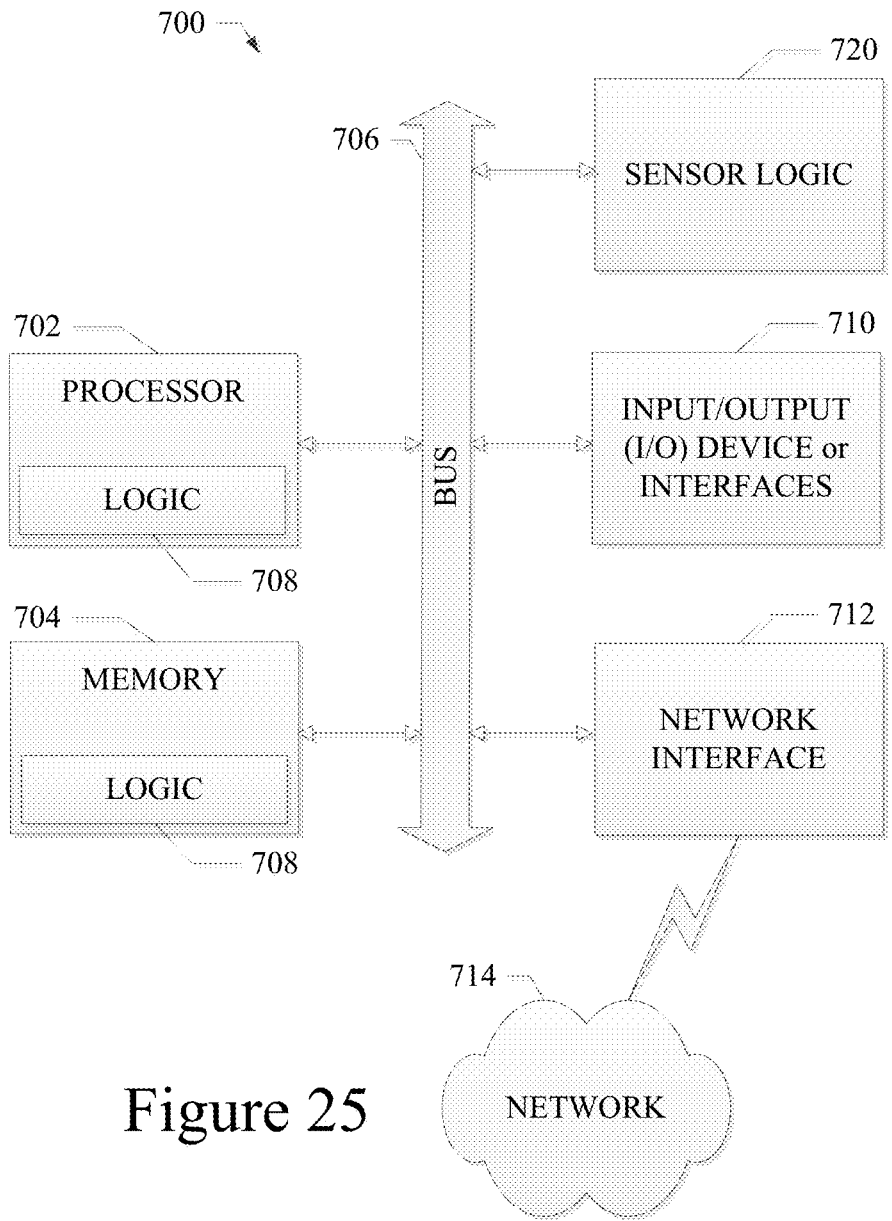
FIG. 25 shows a diagrammatic representation of a machine in the example form of a data processor within which a set of instructions, for causing the machine to perform any one or more of the methodologies described herein, may be executed.

FIG. 25 shows a diagrammatic representation of a machine in the example form of a mobile computing and/or communication system 700 within which a set of instructions when executed and/or processing logic when activated may cause the machine to perform any one or more of the methodologies described and/or claimed herein. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a personal computer (PC), a laptop computer, a tablet computing system, a Personal Digital Assistant (PDA), a cellular telephone, a smartphone, a web appliance, a set-top box (STB), a network router, switch or bridge, or any machine capable of executing a set of instructions (sequential or otherwise) or activating processing logic that specify actions to be taken by that machine. Further, while only a single machine is illustrated, the term "machine" can also be taken to include any collection of machines that individually or jointly execute a set (or multiple sets) of instructions or processing logic to perform any one or more of the methodologies described and/or claimed herein.

The example mobile computing and/or communication system 700 includes a data processor 702 (e.g., a System-on-a-Chip (SoC), general processing core, graphics core, and optionally other processing logic) and a memory 704, which can communicate with each other via a bus or other data transfer system 706. The mobile computing and/or communication system 700 may further include various input/output (I/O) devices and/or interfaces 710, such as a touchscreen display, an audio jack, and optionally a network interface 712. In an example embodiment, the network interface 712 can include a standard wired network interface, such as an Ethernet connection, or one or more radio transceivers configured for compatibility with any one or more standard wireless and/or cellular protocols or access technologies (e.g., 2nd (2G), 2.5, 3rd (3G), 4th (4G) generation, and future generation radio access for cellular systems, Global System for Mobile communication (GSM), General Packet Radio Services (GPRS), Enhanced Data GSM Environment (EDGE), Wideband Code Division Multiple Access (WCDMA), LTE, CDMA2000, WLAN, Wireless Router (WR) mesh, and the like). Network interface 712 may also be configured for use with various other wired and/or wireless communication protocols, including TCP/IP, UDP, SIP, SMS, RTP, WAP, CDMA, TDMA, UMTS, UWB, WiFi, WiMax, Bluetooth, IEEE 802.11x, and the like. In essence, network interface 712 may include or support virtually any wired and/or wireless communication mechanisms by which information may travel between the mobile computing and/or communication system 700 and another computing or communication system via network 714. Sensor logic 720 provides the sensor hardware and/or software to capture sensor input from a user action or system event that is used to assist in the configuration of the data storage system as described above.

The memory 704 can represent a machine-readable medium on which is stored one or more sets of instructions, software, firmware, or other processing logic (e.g., logic 708) embodying any one or more of the methodologies or functions described and/or claimed herein. The logic 708, or a portion thereof, may also reside, completely or at least partially within the processor 702 during execution thereof by the mobile computing and/or communication system 700. As such, the memory 704 and the processor 702 may also constitute machine-readable media. The logic 708, or a portion thereof, may also be configured as processing logic or logic, at least a portion of which is partially implemented in hardware. The logic 708, or a portion thereof, may further be transmitted or received over a network 714 via the network interface 712. While the machine-readable medium of an example embodiment can be a single medium, the term "machine-readable medium" should be taken to include a single non-transitory medium or multiple non-transitory media (e.g., a centralized or distributed database, and/or associated caches and computing systems) that store the one or more sets of instructions. The term "machine-readable medium" can also be taken to include any non-transitory medium that is capable of storing, encoding or carrying a set of instructions for execution by the machine and that cause the machine to perform any one or more of the methodologies of the various embodiments, or that is capable of storing, encoding or carrying data structures utilized by or associated with such a set of instructions. The term "machine-readable medium" can accordingly be taken to include, but not be limited to, solid-state memories, optical media, and magnetic media.

Applications that may include the apparatus and systems of various embodiments broadly include a variety of electronic devices and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In example embodiments, a node configured by an application may constitute a "module" that is configured and operates to perform certain operations as described herein. In other embodiments, the "module" may be implemented mechanically or electronically. For example, a module may comprise dedicated circuitry or logic that is permanently configured (e.g., within a special-purpose processor) to perform certain operations. A module may also comprise programmable logic or circuitry (e.g., as encompassed within a general-purpose processor or other programmable processor) that is temporarily configured by software to perform certain operations. It will be appreciated that the decision to implement a module mechanically, in the dedicated and permanently configured circuitry, or in temporarily configured circuitry (e.g., configured by software) may be driven by cost and time considerations. Accordingly, the term "module" should be understood to encompass a functional entity, be that an entity that is physically constructed, permanently configured (e.g., hardwired) or temporarily configured (e.g., programmed) to operate in a certain manner and/or to perform certain operations described herein.

While the machine-readable medium 704 or 708 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any non-transitory medium that is capable of storing, encoding or embodying a set of instructions for execution by the machine and that cause the machine to perform any one or more of the methodologies described herein. The term "machine-readable medium" shall accordingly be taken to include, but not be limited to, solid-state memories, optical media, and magnetic media.

As noted, the software and/or related data may be transmitted over a network using a transmission medium. The term "transmission medium" shall be taken to include any medium that is capable of storing, encoding or carrying instructions for transmission to and execution by the machine, and includes digital or analog communication signals or other intangible media to facilitate transmission and communication of such software and/or data.

The illustrations of embodiments described herein are intended to provide a general understanding of the structure of various embodiments, and they are not intended to serve as a complete description of all the elements and features of components and systems that might make use of the structures described herein. Many other embodiments will be apparent to those of ordinary skill in the art upon reviewing the description provided herein. Other embodiments may be utilized and derived, such that structural and logical substitutions and changes may be made without departing from the scope of this disclosure. The figures herein are merely representational and may not be drawn to scale. Certain proportions thereof may be exaggerated, while others may be minimized. Accordingly, the specification and drawings are to be regarded in an illustrative rather than a restrictive sense.

The description herein may include terms, such as "up", "down", "upper", "lower", "first", "second", etc. that are used for descriptive purposes only and are not to be construed as limiting. The elements, materials, geometries, dimensions, and sequence of operations may all be varied to suit particular applications. Parts of some embodiments may be included in, or substituted for, those of other embodiments. While the foregoing examples of dimensions and ranges are considered typical, the various embodiments are not limited to such dimensions or ranges.

The Abstract is provided to comply with 37 C.F.R. §1.74(b) to allow the reader to quickly ascertain the nature and gist of the technical disclosure. The Abstract is submitted with the understanding that it will not be used to interpret or limit the scope or meaning of the claims.

In the foregoing Detailed Description, various features are grouped together in a single embodiment for the purpose of streamlining the disclosure. This method of disclosure is not to be interpreted as reflecting an intention that the claimed embodiments have more features than are expressly recited in each claim. The following claims are hereby incorporated into the Detailed Description, with each claim standing on its own as a separate embodiment.

Thus, as described herein, a system and method for implementing a switched direct attached shared storage architecture are disclosed. Although the disclosed subject matter has been described with reference to several example embodiments, it may be understood that the words that have been used are words of description and illustration, rather than words of limitation. Changes may be made within the purview of the appended claims, as presently stated and as amended, without departing from the scope and spirit of the disclosed subject matter in all its aspects. Although the disclosed subject matter has been described with reference to particular means, materials, and embodiments, the disclosed subject matter is not intended to be limited to the particulars disclosed; rather, the subject matter extends to all functionally equivalent structures, methods, and uses such as are within the scope of the appended claims.

What is claimed is:

1. A switched direct attached shared data storage system comprising:
    a plurality of compute nodes, each compute node having integrated compute capabilities, data storage, and a network interface controller (Host NIC), the plurality of compute nodes being in data communication with each other via a local area network, the plurality of compute nodes each including distributed storage processing software resident thereon;
    a plurality of physical data storage devices in data communication with a storage controller; and
    a data store switch fabric enabling data communications between the plurality of compute nodes and the plurality of physical data storage devices via the Host NIC and the storage controller, the data store switch fabric encapsulating data requests from the plurality of compute nodes into Ethernet frames for transport to corresponding physical data storage devices, the encapsulated data requests including information formatted in a native NVMe (Non-Volatile Memory Express) storage protocol compatible with the corresponding physical data storage devices, wherein the data store switch fabric presents an Ethernet MAC (Media Access Control) table based virtual to physical remapping layer enabling the plurality of compute nodes to access the plurality of physical data storage devices in a virtual manner, the Host NIC presenting a Peripheral Component Interconnect Express (PCIe) endpoint to a corresponding compute node and the storage controller, which provides a root complex to a group of NVMe (Non-Volatile Memory Express) solid-state drives.

2. The system as claimed in claim 1 wherein the plurality of physical data storage devices is a plurality of solid-state NVMe (Non-Volatile Memory Express) drives (SSDs).

3. The system as claimed in claim 1 wherein the data store switch fabric is implemented using a protocol from the group consisting of: Ethernet and Peripheral Component Interconnect Express (PCIe).

4. The system as claimed in claim 2 wherein the data store switch fabric enables data communications between the plurality of compute nodes and the plurality of NVMe (Non-Volatile Memory Express) drives in a manner to emulate a direct data connection.

5. The system as claimed in claim 1 wherein the data store switch fabric enables a distributed object store using an object tag format.

6. The system as claimed in claim 1 wherein the data store switch fabric overlaps processing operations to accelerate input/output operations between the plurality of compute nodes and the plurality of physical data storage devices using an Ethernet connection.

7. The system as claimed in claim 1 wherein the storage controller offloads a processing burden of the plurality of compute nodes, thereby allowing the plurality of compute nodes to write to a single data storage replica and have the corresponding data storage device automatically move the updated data to a designated replica within the data store switch fabric using native NVMe (Non-Volatile Memory Express) storage commands.

8. The system as claimed in claim 1 wherein the data store switch fabric implements a peer to peer (P2P) messaging protocol using NVMe (Non-Volatile Memory Express) storage command formats.

9. The system as claimed in claim 1 including an analytics framework to build an analytical model based on storage fabric performance, which can be utilized to estimate compute application runtimes, adjust resource assignments, and optimize the storage fabric performance.

10. A method comprising:
providing a plurality of compute nodes, each compute node having integrated compute capabilities, data storage, and a network interface controller (Host NIC), the plurality of compute nodes being in data communication with each other via a local area network, the plurality of compute nodes each including distributed storage processing software resident thereon;
providing a plurality of physical data storage devices in data communication with a storage controller; and
enabling data communications in a data store switch fabric between the plurality of compute nodes and the plurality of physical data storage devices via the Host NIC and the storage controller, the data store switch fabric encapsulating data requests from the plurality of compute nodes into Ethernet frames for transport to corresponding physical data storage devices, the encapsulated data requests including information formatted in a native NVMe (Non-Volatile Memory Express) storage protocol compatible with the corresponding physical data storage devices, wherein the data store switch fabric presents an Ethernet MAC (Media Access Control) table based virtual to physical remapping layer enabling the plurality of compute nodes to access the plurality of physical data storage devices in a virtual manner, the Host NIC presenting a Peripheral Component Interconnect Express (PCIe) endpoint to a corresponding compute node and the storage controller, which provides a root complex to a group of NVMe (Non-Volatile Memory Express) solid-state drives.

11. The method as claimed in claim 10 wherein the plurality of physical data storage devices is a plurality of solid-state NVMe (Non-Volatile Memory Express) drives (SSDs).

12. The method as claimed in claim 11 wherein the data store switch fabric enables data communications between the plurality of compute nodes and the plurality of NVMe (Non-Volatile Memory Express) drives in a manner to emulate a direct data connection.

13. The method as claimed in claim 10 wherein the data store switch fabric is implemented using a protocol from the group consisting of: Ethernet and Peripheral Component Interconnect Express (PCIe).

14. The method as claimed in claim 10 wherein the data store switch fabric enables a distributed object store using an object tag format.

15. The method as claimed in claim 10 wherein the data store switch fabric overlaps processing operations to accelerate input/output operations between the plurality of compute nodes and the plurality of physical data storage devices using an Ethernet connection.

16. The method as claimed in claim 10 wherein the storage controller offloads a processing burden of the plurality of compute nodes, thereby allowing the plurality of compute nodes to write to a single data storage replica and have the corresponding data storage device automatically move the updated data to a designated replica within the data store switch fabric using native NVMe (Non-Volatile Memory Express) storage commands.

17. The method as claimed in claim 10 wherein the data store switch fabric implements a peer to peer (P2P) messaging protocol using NVMe (Non-Volatile Memory Express) storage command formats.

18. The method as claimed in claim 10 including providing an analytics framework to build an analytical model based on storage fabric performance, which can be utilized to estimate compute application runtimes, adjust resource assignments, and optimize the storage fabric performance.

* * * * *